(12) United States Patent
Gao et al.

(10) Patent No.: US 11,690,050 B2
(45) Date of Patent: Jun. 27, 2023

(54) HYBRID AUTOMATIC REPEAT REQUEST-ACKNOWLEDGEMENT (HARQ-ACK) INFORMATION TRANSMISSION VIA PHYSICAL UPLINK SHARED CHANNEL (PUSCH)

(71) Applicant: CHINA ACADEMY OF TELECOMMUNICATIONS TECHNOLOGY, Beijing (CN)

(72) Inventors: Xuejuan Gao, Beijing (CN); Qianqian Si, Beijing (CN)

(73) Assignee: DATANG MOBILE COMMUNICATIONS EQUIPMENT CO., LTD, Beijing (CN)

(*) Notice: Subject to any disclaimer, the term of this patent is extended or adjusted under 35 U.S.C. 154(b) by 33 days.

(21) Appl. No.: 16/761,219

(22) PCT Filed: Oct. 31, 2018

(86) PCT No.: PCT/CN2018/112929
§ 371 (c)(1),
(2) Date: May 1, 2020

(87) PCT Pub. No.: WO2019/109760
PCT Pub. Date: Jun. 13, 2019

(65) Prior Publication Data
US 2020/0296695 A1 Sep. 17, 2020

(30) Foreign Application Priority Data
Dec. 8, 2017 (CN) .......................... 201711298155.8

(51) Int. Cl.
*H04W 72/04* (2023.01)
*H04L 1/1812* (2023.01)

(52) U.S. Cl.
CPC ........... *H04W 72/04* (2013.01); *H04L 1/1812* (2013.01)

(58) Field of Classification Search
CPC ............... H04W 72/04; H04W 72/042; H04W 72/0446; H04L 1/1812; H04L 1/0026;
(Continued)

(56) References Cited

U.S. PATENT DOCUMENTS

2013/0083748 A1 4/2013 Li
2016/0165640 A1 6/2016 Yang et al.
(Continued)

FOREIGN PATENT DOCUMENTS

CN 102223215 A 10/2011
CN 106301720 A1 1/2017
(Continued)

OTHER PUBLICATIONS

WO 2018028413 A1 (Year: 2017).*
(Continued)

*Primary Examiner* — Rushil Parimal Sampat
(74) *Attorney, Agent, or Firm* — Harness, Dickey & Pierce, P.L.C.

(57) ABSTRACT

The present disclosure provides a PUSCH transmission method, a PUSCH reception method, a UE and a base station. The PUSCH transmission method includes: determining indication information about an HARQ-ACK, the indication information about the HARQ-ACK being at least used to indicate whether there is HARQ-ACK information on a target PUSCH; and transmitting the indication information on the target PUSCH. According to the present disclosure, the indication information about the HARQ-ACK is additionally transmitted by the UE on the PUSCH,
(Continued)

determining indication information about an HARQ-ACK, the indication information about the HARQ-ACK being at least used to indicate whether there is HARQ-ACK information on a target PUSCH — 11 transmitting the indication information on the target PUSCH — 12 and the indication information is at least used to indicate whether there is the HARQ-ACK information on the target PUSCH.

16 Claims, 3 Drawing Sheets

(58) Field of Classification Search
CPC ... H04L 1/1671; H04L 1/1806; H04L 1/1861; H04L 1/1864; H04L 1/1896
See application file for complete search history.

(56) References Cited

U.S. PATENT DOCUMENTS

| | | |
|---|---|---|
| 2016/0338041 A1 | 11/2016 | Li et al. |
| 2017/0048026 A1 | 2/2017 | Park et al. |
| 2017/0318575 A1 | 11/2017 | Park et al. |
| 2018/0205504 A1* | 7/2018 | Lyu .................... H04L 1/16 |
| 2019/0058552 A1 | 2/2019 | Yang et al. |
| 2019/0124688 A1 | 4/2019 | Golitschek Edlervon Elbwart et al. |
| 2019/0141727 A1 | 5/2019 | Si et al. |
| 2019/0238275 A1* | 8/2019 | Sun ..................... H04W 72/042 |

FOREIGN PATENT DOCUMENTS

| | | |
|---|---|---|
| CN | 106961744 A1 | 7/2017 |
| CN | 107359969 A | 11/2017 |
| JP | 2017539124 A | 12/2017 |
| JP | 2018529262 A | 10/2018 |
| WO | 2016093600 A1 | 6/2016 |
| WO | 2017032619 A1 | 3/2017 |
| WO | 2017192025 A1 | 9/2017 |
| WO | 2017192025 A1 | 11/2017 |

OTHER PUBLICATIONS

WO 2017045138 A1 (Year: 2015).*
European Patent Office, Extended European Search Report, Application No. EP18886205.6, dated Dec. 15, 2020, Applicant: China Academy of Telecommunications Technology.
3GPP TSG RAN WG1 Meeting #90, R1-1715193, Prague, Czechia, Aug. 21-25, 2017, Agenda Item 6.1.3.3.3, Source: NTT Docomo, Inc., Title: Offline discussions on some topics for AI6.1.3.3.3, Document for: Discussion and Decision.
Patent Cooperation Treaty, Notification of Transmittal of Copies of Translation of the International Preliminary Report an Patentability, dated Jun. 18, 2019, PCT/CN2018/112929, Applicant: China Academy of Telecommunications Technology.
The State Intellectual Property Office of People's Republic of China, First Office Action, Application No. 201711298155.8, Applicant: China Academy of Telecommunications Technology, dated Mar. 16, 2020.
3GPP TSG RAN WGI Meeting 91, Reno, USA, Nov. 27-Dec. 1, 2017, R1-1719927, LG Electronics, UCI on PUSCH and UL channel multiplexing for NR.
3GPP TSG RAN WGI Meeting #90bis Prague, CZ, Oct. 9-13, 2017 R1-1717831, CATT, Multiplexing of UCI and UL data on PUSCH.
Japanese Patent Office Action, Japanese Patent Application No. 2020-530949, Date of Drafting: Reiwa 3(2021) April 6, Representative/Applicant: Fujita, Kazuko.
NTT Docomo, Inc.,Offline discussions on some topics for AI6.1.3. 3.3 [online],3GPP TSG RAN WG1 Meeting #90 R1-1715193, Prague, Czechia, Aug. 21-25, 2017, Internet <URL:https://www.3gpp.org/ftp/TSG_RAN/WG1_RL1/TSGR1_90/Docs/R1-1715193.zip>,2017, p. 1-23, p. 26.
Korean Office Action dated Sep. 5, 2021 for Application No. KR 10-2020-7013578.
Qualcomm Incorporated, "Multiplexing of PUCCH and PUSCH", Agenda item 7.3.2.3, 3GPP TSG RAN WG1 Meeting 91, R1-1721387, Nov. 27-Dec. 1, 2017, Reno. USA.

* cited by examiner

HYBRID AUTOMATIC REPEAT REQUEST-ACKNOWLEDGEMENT (HARQ-ACK) INFORMATION TRANSMISSION VIA PHYSICAL UPLINK SHARED CHANNEL (PUSCH)

CROSS-REFERENCE TO RELATED APPLICATION

This application is the U.S. national phase of PCT Application No. PCT/CN2018/112929 filed on Oct. 31, 2018, which claims a priority to Chinese Patent Application No. 201711298155.8 filed on Dec. 8, 2017, the disclosure of which is incorporated in its entirety by reference herein.

TECHNICAL FIELD

The present disclosure relates to the field of communication technology, in particular to a Physical Uplink Shared Channel (PUSCH) transmission method, a PUSCH reception method, a User Equipment (UE), and a base station.

BACKGROUND

In a Long Term Evolution (LTE) wireless communication system, when a PUSCH and Uplink Control Information (UCI) are transmitted by a User Equipment (UE) concurrently within a certain substrate and the UE supports the concurrent transmission of a Physical Uplink Control Channel (PUCCH) and the PUSCH, the UCI may be transmitted on the PUCCH, and data m ay be transmitted on the PUSCH. When the UE fails to support the concurrent transmission of the PUCCH and the PUSCH, the UCI together with the data may be transmitted on the PUSCH. The UCI at least includes Hybrid Automatic Repeat reQuest ACKnowledgement (HARQ-ACK), Channel State Information (CSI) and a Scheduling Request (SR).

In the LTE system, the HARQ-ACK is transmitted on the PUSCH through puncturing the data on the PUSCH, i.e., when channel encoding and rate matching operations are performed on the data on the PUSCH, whether the HARQ-ACK exists is not be taken into consideration, and the channel encoding and rate matching operations are performed as if no resource is occupied by the HARQ-ACK. When the HARQ-ACK exists, the HARQ-ACK is mapped onto a corresponding resource in accordance with a predetermined mapping rule and then transmitted. At this time, the HARQ-ACK covers data information on the resource, i.e., the data information is punctured by the HARQ-ACK. In this method, it is able to ensure that the encoding and rate matching operations on the data are not adversely affected by the existence or non-existence of the HARQ-ACK, thereby to ensure an evolved Node B (eNB) and the UE to understand a code rate of the transmitted data consistently. This is because, when downlink data is transmitted by the eNB to the UE, the UE is expected to feed back the HARQ-ACK of the downlink data at a corresponding feedback time point in accordance with a fixed HARQ-ACK feedback timing defined in the LTE system. When the downlink transmission has been lost by the UE, the UE may not feed back the HARQ-ACK for the downlink transmission, so the eNB and the UE may probably understand whether there is the HARQ-ACK at the corresponding feedback time point inconsistently. When there is the PUSCH at the corresponding feedback time point and the UE fails to support the concurrent transmission of the PUCCH and the PUSCH, decoding and rate de-matching operations performed by the eNB on the data transmitted by the UE may not be adversely affected even if the eNB and the UE understand whether there is the HARQ-ACK inconsistently, because the HARQ-ACK is transmitted on the PUSCH through puncturing the data information.

Apart from the fixed HARQ-ACK feedback timing (i.e., a time point when the HARQ-ACK for the downlink transmission is to be fed back is predefined or pre-configured), a $5^{th}$-Generation (5G) New Radio (NR) system also supports a dynamic HARQ-ACK feedback timing, i.e., a time point when the HARQ-ACK for the downlink transmission is to be fed back may be indicated through Downlink Control Information (DCI) corresponding to the downlink transmission. In addition, the 5G NR system further supports mini-slot-based transmission, i.e., a transmission length for each downlink transmission may be shorter than one slot or a length of all downlink symbols in one slot, e.g., 1, 2, 4 or 7 symbols. The 5G NR system further supports the Code Block Group (CBG)-based feedback of the HARQ-ACK as well as multi-carrier transmission. These factors may lead to a much larger quantity of feedback bits of the HARQ-ACK in the 5G NR system than in the LTE system. When the HARQ-ACK is still transmitted on the PUSCH through puncturing the data on the PUSCH, much data information on the PUSCH may be punctured by the HARQ-ACK, and thereby the transmission performance of the PUSCH may be significantly adversely affected.

Hence, in the 5G NR system, the HARQ-ACK having one or two bits is transmitted on the PUSCH through puncturing, and the HARQ-ACK having more than two bits is transmitted on the PUSCH using rate matching, i.e., the resource occupied by the HARQ-ACK is excluded when the encoding and rate matching operations are performed on the data on the PUSCH.

When the HARQ-ACK is transmitted on the PUSCH through rate matching, the encoding and rate matching operation on the data on the PUSCH (i.e., a data code rate) and an actual mapping resource position may be adversely affected by whether there is the HARQ-ACK and the quantity of the bits of the HARQ-ACK. When whether there is the HARQ-ACK and the quantity of the bits of the HARQ-ACK are understood by the eNB in a different manner from the actual transmission performed by the UE, the eNB may decode the PUSCH erroneously, and thereby the PUSCH may be received unsuccessfully. In the 5G NR system, for the PUSCH with uplink grant, the uplink grant may include a Downlink Assignment Index (DAI) indicating the quantity of the bits of the HARQ-ACK transmitted on the PUSCH. Whether there is the HARQ-ACK may be determined in accordance with the DAI and the volume of the actually-received downlink data.

The 5G NR system further supports the transmission of the PUSCH without any uplink grant, e.g., Semi-Persistent Scheduling (SPS) PUSCH or grant-free PUSCH, i.e., the eNB does not transmit any scheduling information for the grant-free PUSCH, and instead, it may merely configure, through Radio Resource Control (RRC) signaling, a position where the grant-free PUSCH is capable of being transmitted and some configuration information for the UE. The UE may transmit the grant-free PUSCH in accordance with the configuration information at the position pre-configured by the eNB. In addition, the 5G NR system further supports the transmission of the PUSCH with the uplink grant including no DAI.

When the HARQ-ACK and the PUSCH exist at a same time point and the concurrent transmission of the PUCCH and the PUSCH is not supported, the HARQ-ACK needs to be carried on the PUSCH for transmission. When the downlink data is transmitted by the eNB to the UE but the UE fails to receive any downlink data, the UE may transmit the data not carrying the HARQ-ACK merely on the PUSCH, i.e., the rate matching operation on the data on the PUSCH may be performed as if there is no HARQ-ACK. However, the eNB is incapable of determining that no downlink data is received by the UE, so it may still detect the HARQ-ACK and the PUSCH using rate matching as if the HARQ-ACK is transmitted on the PUSCH. Hence, the eNB may understand the resource occupied by the data in a different manner from the data actually transmitted by the UE. At this time, the eNB may decode the data erroneously, and thereby a reception error may occur at the eNB.

In a word, in the 5G NR system, when the HARQ-ACK is transmitted on the PUSCH using rate matching, the UE and the eNB may probably understand whether there is the HARQ-ACK on the PUSCH inconsistently, and thereby understand the position of the resource actually used for the data transmission on the PUSCH and a size of the resource inconsistently. At this time, different rate matching results of the data are acquired, and thereby the eNB fails to receive the data on the PUSCH.

SUMMARY

An object of the present disclosure is to provide a PUSCH transmission method, a PUSCH reception method, a UE and a base station, so as to solve the problem in the related art where the base station fails to receive the data transmitted on the PUSCH when the UE and the base station understand whether there is the HARQ-ACK on the PUSCH inconsistently.

In one aspect, the present disclosure provides in some embodiments a PUSCH transmission method, including: determining indication information about an HARQ-ACK, the indication information about the HARQ-ACK being at least used to indicate whether there is HARQ-ACK information on a target PUSCH; and transmitting the indication information on the target PUSCH.

In some possible embodiments of the present disclosure, the transmitting the indication information on the target PUSCH includes transmitting the indication information on the target PUSCH using rate matching.

In some possible embodiments of the present disclosure, the transmitting the indication information on the target PUSCH using rate matching includes determining that data transmitted on the target PUSCH is not mapped to one or more resources occupied by the indication information on the target PUSCH.

In some possible embodiments of the present disclosure, the transmitting the indication information on the target PUSCH includes: determining a first transmission resource occupied by the indication information on the target PUSCH; and performing channel encoding, rate matching and modulation operations sequentially on the indication information, and mapping the indication information to the first transmission resource of the target PUSCH for transmission.

In some possible embodiments of the present disclosure, the determining the first transmission resource occupied by the indication information on the target PUSCH includes: acquiring a predetermined or preconfigured resource position and a predetermined or preconfigured resource size of the first transmission resource on the target PUSCH, or acquiring the predetermined or preconfigured resource position of the first transmission resource on the target PUSCH and determining the resource size of the first transmission resource on the target PUSCH in accordance with a preconfigured configuration parameter and a transmission parameter of the target PUSCH; and determining the first transmission resource in accordance with the resource position and the resource size of the first transmission resource.

In some possible embodiments of the present disclosure, the transmitting the indication information on the target PUSCH includes performing a channel encoding operation independently on the indication information and the data transmitted on the target PUSCH.

In some possible embodiments of the present disclosure, the transmitting the indication information on the target PUSCH includes, when the indication information indicates that there is the HARQ-ACK information on the target PUSCH, performing a channel encoding operation independently on the indication information and the HARQ-ACK information.

In some possible embodiments of the present disclosure, the transmitting the indication information on the target PUSCH includes determining a modulation scheme of the indication information. The modulation scheme of the indication information is identical to a modulation scheme of the target PUSCH, or the modulation scheme of the indication information is determined as a predefined or preconfigured Binary Phase-Shift Keying (BPSK) modulation scheme, Quadrature Phase Shift Keying (QPSK) modulation scheme or 16-Quadrature Amplitude Modulation (QAM) modulation scheme.

In some possible embodiments of the present disclosure, the quantity of bits of the indication information is one. When an indication state of the one-bit indication information is 0, the indication information is used to indicate that there is the HARQ-ACK information on the target PUSCH, and when the indication state of the one-bit indication information is 1, the indication information is used to indicate that there is no HARQ-ACK information on the target PUSCH; or when the indication state of the one-bit indication information is 1, the indication information is used to indicate that there is the HARQ-ACK information on the target PUSCH, and when the indication state of the one-bit indication information is 0, the indication information is used to indicate that there is no HARQ-ACK information on the target PUSCH.

In some possible embodiments of the present disclosure, the indication information includes a first indication field and a second indication field. The first indication field is used to indicate whether there is the HARQ-ACK information on the target PUSCH, the second indication field is used to indicate the quantity of bits of the HARQ-ACK information, and the first indication field and the second indication field are encoded independently or jointly.

In some possible embodiments of the present disclosure, the quantity of bits of the indication information is M, one indication state of the M-bit indication information is used to indicate that there is no HARQ-ACK information on the target PUSCH, the other indication states of the M-bit indication information are used to indicate the quantity of bits of the HARQ-ACK information, where M is an integer greater than 1.

In some possible embodiments of the present disclosure, the target PUSCH is one of a PUSCH without a corresponding uplink grant and a PUSCH without a corresponding DAI; or the target PUSCH is any one of an SPS PUSCH, a grant-free PUSCH, and a PUSCH with a corresponding uplink grant including no DAI.

In some possible embodiments of the present disclosure, prior to determining the indication information, the transmission method further includes determining whether at least one of predetermined conditions is met, and when at least one of the predetermined conditions has been met, determining the indication information. The predetermined conditions include a condition where the quantity of the bits of the HARQ-ACK information transmitted on the target PUSCH is greater than a predetermined value, a condition where the HARQ-ACK information is transmitted on the target PUSCH using rate matching, and a condition where a UE for transmitting the target PUSCH does not support the concurrent transmission of a PUCCH and the PUSCH.

In another aspect, the present disclosure provides in some embodiments a PUSCH reception method, including: receiving indication information about an HARQ-ACK on a target PUSCH, the indication information about the HARQ-ACK being at least used to indicate whether there is HARQ-ACK information on the target PUSCH; and determining whether there is the HARQ-ACK information on the target PUSCH in accordance with the indication information.

In some possible embodiments of the present disclosure, the receiving the indication information about the HARQ-ACK on the target PUSCH includes receiving the indication information on the target PUSCH using rate matching.

In some possible embodiments of the present disclosure, the receiving the indication information on the target PUSCH using rate matching includes determining that data transmitted on the target PUSCH is not mapped to one or more resources occupied by the indication information on the target PUSCH.

In some possible embodiments of the present disclosure, the receiving the indication information about the HARQ-ACK on the target PUSCH includes: determining a first transmission resource occupied by the indication information on the target PUSCH; and receiving the indication information about the HARQ-ACK on the first transmission resource.

In some possible embodiments of the present disclosure, the determining the first transmission resource occupied by the indication information on the target PUSCH includes: acquiring a predetermined or preconfigured resource position and a predetermined or preconfigured resource size of the first transmission resource on the target PUSCH, or acquiring the predetermined or preconfigured resource position of the first transmission resource on the target PUSCH and determining the resource size of the first transmission resource on the target PUSCH in accordance with a preconfigured configuration parameter and a transmission parameter of the target PUSCH; and determining the first transmission resource in accordance with the resource position and the resource size of the first transmission resource.

In some possible embodiments of the present disclosure, the receiving the indication information about the HARQ-ACK on the target PUSCH includes determining that a channel encoding operation is performed independently on the indication information and the data transmitted on the target PUSCH.

In some possible embodiments of the present disclosure, the receiving the indication information about the HARQ-ACK on the target PUSCH includes, when the indication information indicates that there is the HARQ-ACK information on the target PUSCH, determining that the channel encoding operation is performed independently on the indication information and the data transmitted on the target PUSCH.

In some possible embodiments of the present disclosure, the receiving the indication information about the HARQ-ACK on the target PUSCH includes determining a modulation scheme of the indication information. The modulation scheme of the indication information is identical to a modulation scheme of the target PUSCH, or the modulation scheme of the indication information is determined as a predefined or preconfigured BPSK modulation scheme, QPSK modulation scheme or 16QAM modulation scheme.

In some possible embodiments of the present disclosure, the quantity of bits of the indication information is one. When an indication state of the one-bit indication information is 0, the indication information is used to indicate that there is the HARQ-ACK information on the target PUSCH, and when the indication state of the one-bit indication information is 1, the indication information is used to indicate that there is no HARQ-ACK information on the target PUSCH; or when the indication state of the one-bit indication information is 1, the indication information is used to indicate that there is the HARQ-ACK information on the target PUSCH, and when the indication state of the one-bit indication information is 0, the indication information is used to indicate that there is no HARQ-ACK information on the target PUSCH.

In some possible embodiments of the present disclosure, the indication information includes a first indication field and a second indication field. The first indication field is used to indicate whether there is the HARQ-ACK information on the target PUSCH, the second indication field is used to indicate the quantity of bits of the HARQ-ACK information, and the first indication field and the second indication field are encoded independently or jointly.

In some possible embodiments of the present disclosure, the quantity of bits of the indication information is M, one indication state of the M-bit indication information is used to indicate that there is no HARQ-ACK information on the target PUSCH, the other indication states of the M-bit indication information are used to indicate the quantity of bits of the HARQ-ACK information, where M is an integer greater than 1.

In some possible embodiments of the present disclosure, the target PUSCH is one of a PUSCH without a corresponding uplink grant and a PUSCH without a corresponding DAI; or the target PUSCH is any one of an SPS PUSCH, a grant-free PUSCH, and a PUSCH with a corresponding uplink grant including no DAI.

In some possible embodiments of the present disclosure, prior to receiving the indication information about the HARQ-ACK on the target PUSCH, the method further includes determining whether at least one of predetermined conditions is met, and when at least one of the predetermined conditions has been met, receiving the indication information about the HARQ-ACK on the target PUSCH. The predetermined conditions include a condition where the quantity of the bits of the HARQ-ACK information transmitted on the target PUSCH is greater than a predetermined value, a condition where the HARQ-ACK information is transmitted on the target PUSCH using rate matching, and a condition where a UE for transmitting the target PUSCH does not support the concurrent transmission of a PUCCH and the PUSCH.

In yet another aspect, the present disclosure provides in some embodiments a UE, including a transceiver, a memory, a processor, and a computer program stored in the memory and executed by the processor. The processor is configured to read the computer program in the memory, so as to determine indication information about an HARQ-ACK, and the indication information about the HARQ-ACK is at least used to indicate whether there is HARQ-ACK information on a target PUSCH. The transceiver is configured to transmit the indication information on the target PUSCH.

In some possible embodiments of the present disclosure, the transceiver is further configured to transmit the indication information on the target PUSCH using rate matching.

In some possible embodiments of the present disclosure, the processor is further configured to determine that data transmitted on the target PUSCH is not mapped to one or more resources occupied by the indication information on the target PUSCH.

In some possible embodiments of the present disclosure, the processor is further configured to: determine a first transmission resource occupied by the indication information on the target PUSCH; and perform channel encoding, rate matching and modulation operations sequentially on the indication information, and map the indication information to the first transmission resource of the target PUSCH for transmission.

In some possible embodiments of the present disclosure, the processor is further configured to: acquire a predetermined or preconfigured resource position and a predetermined or preconfigured resource size of the first transmission resource on the target PUSCH, or acquire the predetermined or preconfigured resource position of the first transmission resource on the target PUSCH and determine the resource size of the first transmission resource on the target PUSCH in accordance with a preconfigured configuration parameter and a transmission parameter of the target PUSCH; and determine the first transmission resource in accordance with the resource position and the resource size of the first transmission resource.

In some possible embodiments of the present disclosure, the processor is further configured to perform a channel encoding operation independently on the indication information and the data transmitted on the target PUSCH.

In some possible embodiments of the present disclosure, the processor is further configured to, when the indication information indicates that there is the HARQ-ACK information on the target PUSCH, perform a channel encoding operation independently on the indication information and the HARQ-ACK information.

In some possible embodiments of the present disclosure, the processor is further configured to determine a modulation scheme of the indication information. The modulation scheme of the indication information is identical to a modulation scheme of the target PUSCH, or the modulation scheme of the indication information is determined as a predefined or preconfigured BPSK modulation scheme, QPSK modulation scheme or 16QAM modulation scheme.

In some possible embodiments of the present disclosure, the quantity of bits of the indication information is one. When an indication state of the one-bit indication information is 0, the indication information is used to indicate that there is the HARQ-ACK information on the target PUSCH, and when the indication state of the one-bit indication information is 1, the indication information is used to indicate that there is no HARQ-ACK information on the target PUSCH; or when the indication state of the one-bit indication information is 1, the indication information is used to indicate that there is the HARQ-ACK information on the target PUSCH, and when the indication state of the one-bit indication information is 0, the indication information is used to indicate that there is no HARQ-ACK information on the target PUSCH.

In some possible embodiments of the present disclosure, the indication information includes a first indication field and a second indication field. The first indication field is used to indicate whether there is the HARQ-ACK information on the target PUSCH, the second indication field is used to indicate the quantity of bits of the HARQ-ACK information, and the first indication field and the second indication field are encoded independently or jointly.

In some possible embodiments of the present disclosure, the quantity of bits of the indication information is M, one indication state of the M-bit indication information is used to indicate that there is no HARQ-ACK information on the target PUSCH, the other indication states of the M-bit indication information are used to indicate the quantity of bits of the HARQ-ACK information, where M is an integer greater than 1.

In some possible embodiments of the present disclosure, the target PUSCH is one of a PUSCH without a corresponding uplink grant and a PUSCH without a corresponding DAI; or the target PUSCH is any one of an SPS PUSCH, a grant-free PUSCH, and a PUSCH with a corresponding uplink grant including no DAI.

In some possible embodiments of the present disclosure, the processor is further configured to determine whether at least one of predetermined conditions is met, and when at least one of the predetermined conditions has been met, determine the indication information. The predetermined conditions include a condition where the quantity of the bits of the HARQ-ACK information transmitted on the target PUSCH is greater than a predetermined value, a condition where the HARQ-ACK information is transmitted on the target PUSCH using rate matching, and a condition where a UE for transmitting the target PUSCH does not support the concurrent transmission of a PUCCH and the PUSCH.

In still yet another aspect, the present disclosure provides in some embodiments a PUSCH transmission device, including: an information determination module configured to determine indication information about an HARQ-ACK, the indication information about the HARQ-ACK being at least used to indicate whether there is HARQ-ACK information on a target PUSCH; and an information transmission module configured to transmit the indication information on the target PUSCH.

In still yet another aspect, the present disclosure provides in some embodiments a computer-readable storage medium storing therein a computer program. The computer program is executed by a processor so as to implement the above-mentioned PUSCH transmission method.

In still yet another aspect, the present disclosure provides in some embodiments a base station, including a transceiver, a memory, a processor, and a computer program stored in the memory and executed by the processor. The transceiver is configured to receive indication information about an HARQ-ACK on a target PUSCH, and the indication information about the HARQ-ACK is at least used to indicate whether there is HARQ-ACK information on the target PUSCH. The processor is configured to read the computer program stored in the memory so as to determine whether there is the HARQ-ACK information on the target PUSCH in accordance with the indication information.

In some possible embodiments of the present disclosure, the transceiver is further configured to receive the indication information on the target PUSCH using rate matching.

In some possible embodiments of the present disclosure, the processor is further configured to determine that data transmitted on the target PUSCH is not mapped to one or more resources occupied by the indication information on the target PUSCH.

In some possible embodiments of the present disclosure, the processor is further configured to determine a first transmission resource occupied by the indication information on the target PUSCH, and the transceiver is further configured to receive the indication information about the HARQ-ACK on the first transmission resource.

In some possible embodiments of the present disclosure, the processor is further configured to: acquire a predetermined or preconfigured resource position and a predetermined or preconfigured resource size of the first transmission resource on the target PUSCH, or acquire the predetermined or preconfigured resource position of the first transmission resource on the target PUSCH and determining the resource size of the first transmission resource on the target PUSCH in accordance with a preconfigured configuration parameter and a transmission parameter of the target PUSCH; and determine the first transmission resource in accordance with the resource position and the resource size of the first transmission resource.

In some possible embodiments of the present disclosure, the processor is further configured to determine that a channel encoding operation is performed independently on the indication information and the data transmitted on the target PUSCH.

In some possible embodiments of the present disclosure, the processor is further configured to, when the indication information indicates that there is the HARQ-ACK information on the target PUSCH, determine that the channel encoding operation is performed independently on the indication information and the data transmitted on the target PUSCH.

In some possible embodiments of the present disclosure, the processor is further configured to determine a modulation scheme of the indication information. The modulation scheme of the indication information is identical to a modulation scheme of the target PUSCH, or the modulation scheme of the indication information is determined as a predefined or preconfigured BPSK modulation scheme, QPSK modulation scheme or 16QAM modulation scheme.

In some possible embodiments of the present disclosure, the quantity of bits of the indication information is one. When an indication state of the one-bit indication information is 0, the indication information is used to indicate that there is the HARQ-ACK information on the target PUSCH, and when the indication state of the one-bit indication information is 1, the indication information is used to indicate that there is no HARQ-ACK information on the target PUSCH; or when the indication state of the one-bit indication information is 1, the indication information is used to indicate that there is the HARQ-ACK information on the target PUSCH, and when the indication state of the one-bit indication information is 0, the indication information is used to indicate that there is no HARQ-ACK information on the target PUSCH.

In some possible embodiments of the present disclosure, the indication information includes a first indication field and a second indication field. The first indication field is used to indicate whether there is the HARQ-ACK information on the target PUSCH, the second indication field is used to indicate the quantity of bits of the HARQ-ACK information, and the first indication field and the second indication field are encoded independently or jointly.

In some possible embodiments of the present disclosure, the quantity of bits of the indication information is M, one indication state of the M-bit indication information is used to indicate that there is no HARQ-ACK information on the target PUSCH, the other indication states of the M-bit indication information are used to indicate the quantity of bits of the HARQ-ACK information, where M is an integer greater than 1.

In some possible embodiments of the present disclosure, the target PUSCH is one of a PUSCH without a corresponding uplink grant and a PUSCH without a corresponding DAI; or the target PUSCH is any one of an SPS PUSCH, a grant-free PUSCH, and a PUSCH with a corresponding uplink grant including no DAI.

In some possible embodiments of the present disclosure, the processor is further configured to determine whether at least one of predetermined conditions is met, and when at least one of the predetermined conditions has been met, receive the indication information about the HARQ-ACK on the target PUSCH. The predetermined conditions include a condition where the quantity of the bits of the HARQ-ACK information transmitted on the target PUSCH is greater than a predetermined value, a condition where the HARQ-ACK information is transmitted on the target PUSCH using rate matching, and a condition where a UE for transmitting the target PUSCH does not support the concurrent transmission of a PUCCH and the PUSCH.

In still yet another aspect, the present disclosure provides in some embodiments a PUSCH reception device, including: an information reception module configured to receive indication information about an HARQ-ACK on a target PUSCH, the indication information about the HARQ-ACK being at least used to indicate whether there is HARQ-ACK information on the target PUSCH; and a determination module configured to determine whether there is the HARQ-ACK information on the target PUSCH in accordance with the indication information.

In still yet another aspect, the present disclosure provides in some embodiments a computer-readable storage medium storing therein a computer program. The computer program is executed by a processor so as to implement the above-mentioned PUSCH reception method.

The present disclosure at least has the following beneficial effects. According to the PUSCH transmission method, the PUSCH reception method, the UE and the base station in the embodiments of the present disclosure, the UE may additionally transmit the indication information about the HARQ-ACK on the target PUSCH, and the indication information about the HARQ-ACK may be at least used to indicate whether there is the HARQ-ACK information on the target PUSCH. As a result, it is able for the base station to determine whether there is the HARQ-ACK information on the target PUSCH in accordance with the indication information transmitted on the target PUSCH, enable the UE and the base station to understand the resources occupied by the data transmitted on the target PUSCH consistently, and enable the base station to correctly receive the data transmitted on the target PUSCH, thereby to improve the transmission performance.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments.

Figure 1:
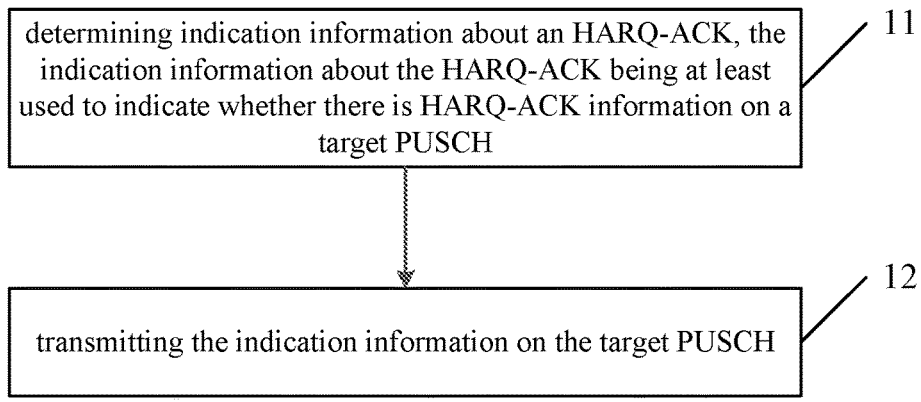
FIG. 1 is a flow chart of a PUSCH transmission method according to some embodiments of the present disclosure.

As shown in FIG. 1, the present disclosure provides in some embodiments a PUSCH transmission method, which includes: Step 11 of determining indication information about an HARQ-ACK, the indication information about the HARQ-ACK being at least used to indicate whether there is HARQ-ACK information on a target PUSCH; and Step 12 of transmitting the indication information on the target PUSCH.

In the embodiments of the present disclosure, a UE may determine a content in the indication information in accordance with whether a Transmission Block (TB) or a Code Block Group (CBG) has been received from a base station on a PDSCH or whether a PDCCH indicating the release of a downlink SPS resource has been received. It should be appreciated that, the indication information on the target PUSCH transmitted at an uplink transmission time point may be indication information about the HARQ-ACK with respect to one PDSCH or one PDCCH indicating the release of the downlink SPS resource, or indication information about the HARQ-ACK with respect to a plurality of PDSCHs and/or PDCCHs indicating the release of the downlink SPS resources. To be specific, a downlink transmission range at a current uplink transmission time point may be determined in accordance with HARQ-ACK feedback timing, which will not be particularly defined herein.

In some possible embodiments of the present disclosure, when the quantity of bits of the indication information is one and an indication state of the one-bit indication information is 0, the indication information may be used to indicate that there is the HARQ-ACK information on the target PUSCH, and when the indication state of the one-bit indication information is 1, the indication information may be used to indicate that there is no HARQ-ACK information on the target PUSCH. In another possible embodiment of the present disclosure, when the indication state of the one-bit indication information is 1, the indication information may be used to indicate that there is the HARQ-ACK information on the target PUSCH, and when the indication state of the one-bit indication information is 0, the indication information may be used to indicate that there is no HARQ-ACK information on the target PUSCH.

In some possible embodiments of the present disclosure, the indication information may include a first indication field and a second indication field. The first indication field may be used to indicate whether there is the HARQ-ACK information on the target PUSCH, the second indication field may be used to indicate the quantity of bits of the HARQ-ACK information, and the first indication field and the second indication field may be encoded independently or jointly.

To be specific, the quantity of bits of the first indication field may be one. For example, when the one-bit first indication field is 0, the first indication field may be used to indicate that there is the HARQ-ACK information on the target PUSCH, and when the one-bit first indication field is 1, the first indication field may be used to indicate that there is no HARQ-ACK information on the target PUSCH. For another example, when the one-bit first indication field is 1, the first indication field may be used to indicate that there is the HARQ-ACK information on the target PUSCH, and when the one-bit first indication field is 0, the first indication field may be used to indicate that there is no HARQ-ACK information on the target PUSCH.

The quantity of bits of the second indication field may be greater than one. For example, the quantity of bits of the second indication field may be two; at this time the second indication field may be used to indicate four states, and each state may correspond to one value of the quantity of bits of the HARQ-ACK information. In addition, the second indication field may be used to, in a many-to-one manner, indicate more than four values of the quantities of bits of the HARQ-ACK information through four states. For example, when the two-bit second indication field is 00, the second indication field may be used to indicate that the quantity of bits of the HARQ-ACK information is 1, 5 or 9; when the two-bit second indication field is 01, the second indication field may be used to indicate that the quantity of bits of the HARQ-ACK information is 2, 6 or 10; when the two-bit second indication field is 10, the second indication field may be used to indicate that the quantity of bits of the HARQ-ACK information is 3, 7 or 11; and when the two-bit second indication field is 11, the second indication field may be used to indicate that the quantity of bits of the HARQ-ACK information is 4, 8 or 12. The value of the quantity of bits corresponding to a same state may be determined in accordance with the quantity of actually-received downlink data packets (including the PDSCHs and the PDCCHs indicating the release of the downlink SPS resources), which will not be particularly defined herein.

To be specific, the first indication field and the second indication field may be encoded independently or jointly. When they are encoded independently, whether there is the second indication field in the indication information may be determined in accordance with an indication content in the first indication field. For example, when the first indication field indicates that there is not HARQ-ACK information on the target PUSCH, it may be determined that there is no second indication field. When the first indication field indicates that there is the HARQ-ACK information on the target PUSCH, it may be determined that there is the second indication field. When they are encoded jointly, the first indication field and the second indication field may coexist all the time.

In another possible embodiment of the present disclosure, the quantity of bits of the indication information may be M, one indication state of the M-bit indication information may be used to indicate that there is no HARQ-ACK information on the target PUSCH, the other indication states of the M-bit indication information may be used to indicate the quantity of bits of the HARQ-ACK information, where M is an integer greater than 1.

For example, when M=2, the indication information may include four indication states. For example, the indication state 00 represents that there is no HARQ-ACK information on the target PUSCH and represents that the quantity of bits of the HARQ-ACK information is 0; the indication state 01 represents that the quantity of bits of the HARQ-ACK information is 1, 4 or 7; the indication state 10 represents that the quantity of bits of the HARQ-ACK information is 2, 5 or 8; and the indication state 11 represents that the quantity of bits of the HARQ-ACK information is 3, 6 or 9. A value of the quantity of bits corresponding to a same indication state may be determined in accordance with the actually-received downlink data packets. Of course, M may also be 3, and at this time one indication state of eight indication states may be used to indicate that there is no HARQ-ACK information on the target PUSCH, and the remaining seven indication states may be used to indicate seven values of the quantities of bits or seven sets of values of the quantities of bits.

In some possible embodiments of the present disclosure, Step 12 may include transmitting the indication information on the target PUSCH using rate matching.

To be specific, the transmitting the indication information on the target PUSCH using rate matching may include determining that data transmitted on the target PUSCH is not mapped to one or more resources occupied by the indication information on the target PUSCH.

To be specific, Step 12 may include: determining a first transmission resource occupied by the indication information on the target PUSCH; and performing channel encoding, rate matching and modulation operations sequentially on the indication information, and mapping the indication information to the first transmission resource of the target PUSCH for transmission.

It should be appreciated that, a channel encoding mode of the indication information may be any one of repetition coding, coding with a placeholder, Reed-Muller (RM) coding, Tail Biting Convolutional Coding (TBCC), polar code and Low Density Parity Check Code (LDPC), or a combination thereof.

Further, the determining the first transmission resource occupied by the indication information on the target PUSCH may include: acquiring a predetermined or preconfigured resource position and a predetermined or preconfigured resource size of the first transmission resource on the target PUSCH, or acquiring the predetermined or preconfigured resource position of the first transmission resource on the target PUSCH and determining the resource size of the first transmission resource on the target PUSCH in accordance with a preconfigured configuration parameter and a transmission parameter of the target PUSCH; and determining the first transmission resource in accordance with the resource position and the resource size of the first transmission resource.

The resource position of the first transmission resource may be pre-agreed or preconfigured. For example, the first transmission resource may be located on one or more predetermined frequency-domain resources on a first symbol or first number A of symbols of the PUSCH, or located on one or more predetermined frequency-domain resources on symbols at one or both sides of a Demodulation Reference Signal (DMRS) of the PUSCH, or discretely distributed on one or more predetermined frequency-domain resources on a plurality of symbols occupied by the PUSCH. The predetermined frequency-domain resources may include number B of Resource Elements (REs) at a high-frequency or low-frequency end of the frequency-domain resource of the PUSCH, or number B of REs discretely distributed on the frequency-domain resource of the PUSCH, or number B of REs uniformly distributed at the high-frequency end and the low-frequency end of the frequency-domain resource of the PUSCH.

The resource size of the first transmission resource may be predetermined or preconfigured, or determined by the UE in accordance with the configuration parameter and the transmission parameter of the PUSCH. For example, a resource offset parameter for determining the indication information may be preconfigured through high-layer signaling, and then the resource size of the first transmission resource of the indication information on the PUSCH in accordance with the resource offset parameter and the transmission parameter of the PUSCH (e.g., a Modulation Coding Scheme (MCS) level and a resource size).

In order to prevent different pieces of information transmitted on the target PUSCH from being confused, Step 12 may further include: performing a channel encoding operation independently on the indication information and the data transmitted on the target PUSCH; and/or when the indication information indicates that there is the HARQ-ACK information on the target PUSCH, performing a channel encoding operation independently on the indication information and the HARQ-ACK information.

In the embodiments of the present disclosure, Step 12 may further include determining a modulation scheme of the indication information. The modulation scheme of the indication information may be identical to a modulation scheme of the target PUSCH, or the modulation scheme of the indication information may be determined as a predefined or preconfigured BPSK modulation scheme, QPSK modulation scheme or 16QAM modulation scheme.

It should be appreciated that, a base station may determine the modulation scheme of the indication information in a similar way to the UE. In this way, the base station may demodulate the indication information through a demodulation scheme corresponding to the demodulation scheme of the indication information, so as to correctly receive the indication information.

In some possible embodiments of the present disclosure, the target PUSCH may be one of a PUSCH without a corresponding uplink grant and a PUSCH without a corresponding DAI.

In another possible embodiment of the present disclosure, the target PUSCH may be any one of an SPS PUSCH, a grant-free PUSCH, and a PUSCH with a corresponding uplink grant including no DAI.

Prior to Step 11, the PUSCH transmission method may further include determining whether at least one of predetermined conditions is met, proceeding to Step 11 when at least one of the predetermined conditions has been met, and otherwise not performing Steps 11 and 12. The predetermined conditions may include a first condition where the quantity of the bits of the HARQ-ACK information transmitted on the target PUSCH is greater than a predetermined value, a second condition where the HARQ-ACK information is transmitted on the target PUSCH using rate matching, and a third condition where a UE for transmitting the target PUSCH does not support the concurrent transmission of a PUCCH and the PUSCH.

According to the embodiments of the present disclosure, the UE may additionally transmit the indication information about the HARQ-ACK on the target PUSCH, and the indication information about the HARQ-ACK may be at least used to indicate whether there is the HARQ-ACK information on the target PUSCH. As a result, it is able for the base station to determine whether there is the HARQ-ACK information on the target PUSCH in accordance with the indication information transmitted on the target PUSCH, enable the UE and the base station to understand the resources occupied by the data transmitted on the target PUSCH consistently, and enable the base station to correctly receive the data transmitted on the target PUSCH, thereby to improve the transmission performance.

Figure 2:
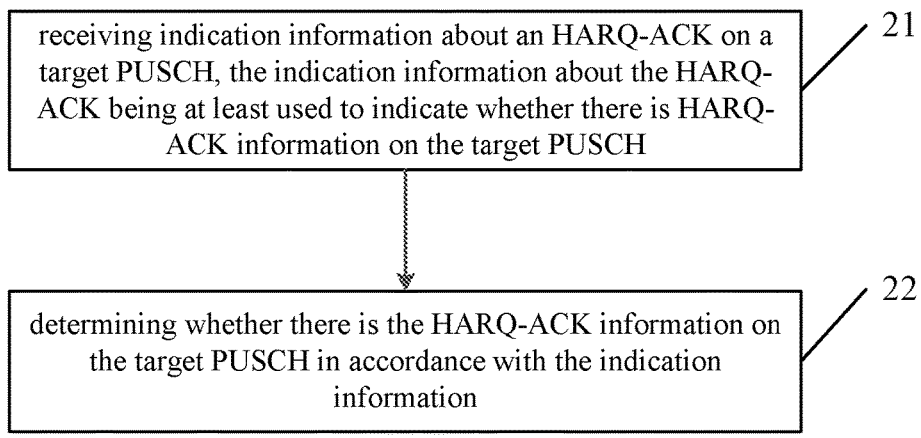
FIG. 2 is a flow chart of a PUSCH reception method according to some embodiments of the present disclosure.

As shown in FIG. 2, the present disclosure further provides in some embodiments a PUSCH reception method, which includes: Step 21 of receiving indication information about an HARQ-ACK on a target PUSCH, the indication information about the HARQ-ACK being at least used to indicate whether there is HARQ-ACK information on the target PUSCH; and Step 22 of determining whether there is the HARQ-ACK information on the target PUSCH in accordance with the indication information.

In some possible embodiments of the present disclosure, when the quantity of bits of the indication information is one and an indication state of the one-bit indication information is 0, the indication information may be used to indicate that there is the HARQ-ACK information on the target PUSCH, and when the indication state of the one-bit indication information is 1, the indication information may be used to indicate that there is no HARQ-ACK information on the target PUSCH. In another possible embodiment of the present disclosure, when the indication state of the one-bit indication information is 1, the indication information may be used to indicate that there is the HARQ-ACK information on the target PUSCH, and when the indication state of the one-bit indication information is 0, the indication information may be used to indicate that there is no HARQ-ACK information on the target PUSCH.

In some possible embodiments of the present disclosure, the indication information may include a first indication field and a second indication field. The first indication field may be used to indicate whether there is the HARQ-ACK information on the target PUSCH, the second indication field may be used to indicate the quantity of bits of the HARQ-ACK information, and the first indication field and the second indication field may be encoded independently or jointly.

To be specific, the quantity of bits of the first indication field may be one. For example, when the one-bit first indication field is 0, the first indication field may be used to indicate that there is the HARQ-ACK information on the target PUSCH, and when the one-bit first indication field is 1, the first indication field may be used to indicate that there is no HARQ-ACK information on the target PUSCH. For another example, when the one-bit first indication field is 1, the first indication field may be used to indicate that there is the HARQ-ACK information on the target PUSCH, and when the one-bit first indication field is 0, the first indication field may be used to indicate that there is no HARQ-ACK information on the target PUSCH.

The quantity of bits of the second indication field may be greater than one. For example, the quantity of bits of the second indication field may be two; at this time the second indication field may be used to indicate four states, and each state may correspond to one value of the quantity of bits of the HARQ-ACK information. In addition, the second indication field may be used to, in a many-to-one manner, indicate more than four values of the quantities of bits of the HARQ-ACK information through four states. For example, when the two-bit second indication field is 00, the second indication field may be used to indicate that the quantity of bits of the HARQ-ACK information is 1, 5 or 9; when the two-bit second indication field is 01, the second indication field may be used to indicate that the quantity of bits of the HARQ-ACK information is 2, 6 or 10; when the two-bit second indication field is 10, the second indication field may be used to indicate that the quantity of bits of the HARQ-ACK information is 3, 7 or 11; and when the two-bit second indication field is 11, the second indication field may be used to indicate that the quantity of bits of the HARQ-ACK information is 4, 8 or 12. The value of the quantity of bits corresponding to a same state may be determined in accordance with the quantity of actually-received downlink data packets (including the PDSCHs and the PDCCHs indicating the release of the downlink SPS resources), which will not be particularly defined herein.

To be specific, the first indication field and the second indication field may be encoded independently or jointly. When they are encoded independently, whether there is the second indication field in the indication information may be determined in accordance with an indication content in the first indication field. For example, when the first indication field indicates that there is no HARQ-ACK information on the target PUSCH, it may be determined that there is no second indication field. When the first indication field indicates that there is the HARQ-ACK information on the target PUSCH, it may be determined that there is the second indication field. When they are encoded jointly, the first indication field and the second indication field may coexist all the time.

In another possible embodiment of the present disclosure, the quantity of bits of the indication information may be M, one indication state of the M-bit indication information may be used to indicate that there is no HARQ-ACK information on the target PUSCH, the other indication states of the M-bit indication information may be used to indicate the quantity of bits of the HARQ-ACK information, where M is an integer greater than 1.

For example, when M=2, the indication information may include four indication states. For example, the indication state 00 represents that there is no HARQ-ACK information on the target PUSCH and represents that the quantity of bits of the HARQ-ACK information is 0; the indication state 01 represents that the quantity of bits of the HARQ-ACK information is 1, 4 or 7; the indication state 10 represents that the quantity of bits of the HARQ-ACK information is 2, 5 or 8; and the indication state 11 represents that the quantity of bits of the HARQ-ACK information is 3, 6 or 9. A value of the quantity of bits corresponding to a same indication state may be determined in accordance with the actually-received downlink data packets. Of course, M may also be 3, and at this time one indication state of eight indication states may be used to indicate that there is no HARQ-ACK information on the target PUSCH, and the remaining seven indication states may be used to indicate seven values of the quantities of bits or seven sets of values of the quantities of bits.

In some possible embodiments of the present disclosure, Step 21 may include receiving the indication information on the target PUSCH using rate matching.

In some possible embodiments of the present disclosure, the receiving the indication information on the target PUSCH using rate matching includes determining that data transmitted on the target PUSCH is not mapped to one or more resources occupied by the indication information on the target PUSCH.

In some possible embodiments of the present disclosure, Step 21 may include: determining a first transmission resource occupied by the indication information on the target PUSCH; and receiving the indication information about the HARQ-ACK on the first transmission resource.

Further, the determining the first transmission resource occupied by the indication information on the target PUSCH includes: acquiring a predetermined or preconfigured resource position and a predetermined or preconfigured resource size of the first transmission resource on the target PUSCH, or acquiring the predetermined or preconfigured resource position of the first transmission resource on the target PUSCH and determining the resource size of the first transmission resource on the target PUSCH in accordance with a preconfigured configuration parameter and a transmission parameter of the target PUSCH; and determining the first transmission resource in accordance with the resource position and the resource size of the first transmission resource.

The resource position of the first transmission resource may be pre-agreed or preconfigured. For example, the first transmission resource may be located on one or more predetermined frequency-domain resources on a first symbol or first number A of symbols of the PUSCH, or located on one or more predetermined frequency-domain resources on symbols at one or both sides of a DMRS of the PUSCH, or discretely distributed on one or more predetermined frequency-domain resources on a plurality of symbols occupied by the PUSCH. The predetermined frequency-domain resources may include number B of REs at a high-frequency or low-frequency end of the frequency-domain resource of the PUSCH, or number B of REs discretely distributed on the frequency-domain resource of the PUSCH, or number B of REs uniformly distributed at the high-frequency end and the low-frequency end of the frequency-domain resource of the PUSCH.

The resource size of the first transmission resource may be predetermined or preconfigured, or determined by the UE in accordance with the configuration parameter and the transmission parameter of the PUSCH. For example, a resource offset parameter for determining the indication information may be preconfigured through high-layer signaling, and then the resource size of the first transmission resource of the indication information on the PUSCH in accordance with the resource offset parameter and the transmission parameter of the PUSCH (e.g., an MCS level and a resource size).

In order to prevent different pieces of information transmitted on the target PUSCH from being confused, Step 21 may include: determining that a channel encoding operation is performed independently on the indication information and the data transmitted on the target PUSCH; and/or when the indication information indicates that there is the HARQ-ACK information on the target PUSCH, determining that the channel encoding operation is performed independently on the indication information and the data transmitted on the target PUSCH.

In some possible embodiments of the present disclosure, Step 21 may further include determining a modulation scheme of the indication information. The modulation scheme of the indication information may be identical to a modulation scheme of the target PUSCH, or the modulation scheme of the indication information may be determined as a predefined or preconfigured BPSK modulation scheme, QPSK modulation scheme or 16QAM modulation scheme.

It should be appreciated that, a base station may determine the modulation scheme of the indication information in a similar way to the UE. In this way, the base station may demodulate the indication information through a demodulation scheme corresponding to the demodulation scheme of the indication information, so as to correctly receive the indication information.

In some possible embodiments of the present disclosure, the target PUSCH may be one of a PUSCH without a corresponding uplink grant and a PUSCH without a corresponding DAI; or the target PUSCH may be any one of an SPS PUSCH, a grant-free PUSCH, and a PUSCH with a corresponding uplink grant including no DAI.

Prior to Step 21, the reception method may further include determining whether at least one of predetermined conditions is met, proceeding to Step 21 when at least one of the predetermined conditions has been met, and otherwise not performing Steps 21 and 22. The predetermined conditions may include a first condition where the quantity of the bits of the HARQ-ACK information transmitted on the target PUSCH is greater than a predetermined value, a second condition where the HARQ-ACK information is transmitted on the target PUSCH using rate matching, and a third condition where a UE for transmitting the target PUSCH does not support the concurrent transmission of a PUCCH and the PUSCH.

According to the embodiments of the present disclosure, the UE may additionally transmit the indication information about the HARQ-ACK on the target PUSCH, and the indication information about the HARQ-ACK may be at least used to indicate whether there is the HARQ-ACK information on the target PUSCH. As a result, it is able for the base station to determine whether there is the HARQ-ACK information on the target PUSCH in accordance with the indication information transmitted on the target PUSCH, enable the UE and the base station to understand the resources occupied by the data transmitted on the target PUSCH consistently, and enable the base station to correctly receive the data transmitted on the target PUSCH, thereby to improve the transmission performance.

In order to describe the PUSCH transmission and reception methods in a clearer manner, the PUSCH transmission and reception methods will be described hereinafter in more details in conjunction with the embodiments.

Figure 3:
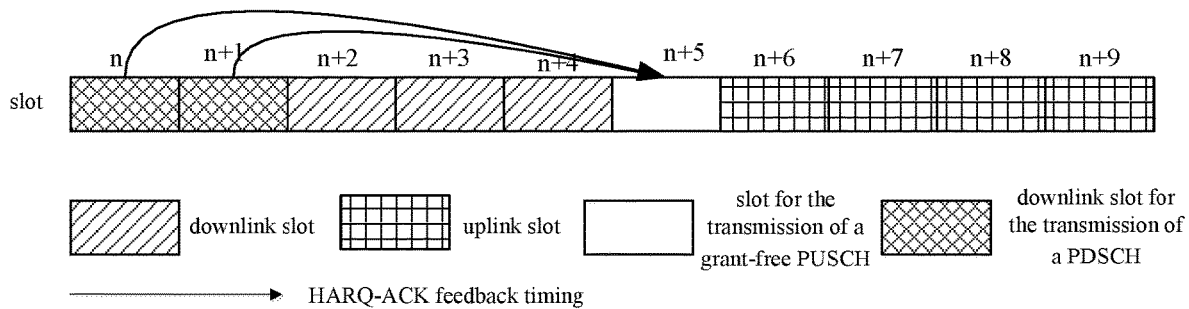
FIG. 3 is a schematic view showing a principle of transmission slots in the PUSCH transmission method and the PUSCH reception method according to some embodiments of the present disclosure.

It is presumed that the HARQ-ACK information for two PDSCHs is fed back at a same uplink time point (e.g., the target PUSCH). The uplink time point may be notified through the first indication field of a first PDCCH corresponding to each PDSCH, or determined in accordance with a predefined or preconfigured feedback timing, which will not be particularly defined herein. For example, as shown in FIG. 3, slots n, n+1, n+2, n+3 and n+4 are downlink slots, and slots n+5, n+6, n+7, n+8 and n+9 are uplink slots. The two PDSCHs may be transmitted sequentially by the base station within the slots n and n+1, and the HARQ-ACK information for the two PDSCHs transmitted within the slots n and n+1 may be fed back within the slot n+5. The slot n+5 may be a slot for a grant-free PUSCH.

It is presumed that each PDSCH corresponds to four-bit HARQ-ACK information (e.g., each PDSCH may include one TB, each TB is configured for the CBG-based HARQ-ACK, and each TB includes four CBGs). At the uplink time point, totally the HARQ-ACK information having eight bits may be transmitted. The quantity of bits of the HARQ-ACK information may be notified through the second indication field of the PDCCH corresponding to the PDSCH, or may be a pre-agreed or preconfigured constant value.

When the uplink time point is configured for the grant-free PUSCH (i.e., the target PUSCH is the grant-free PUSCH) and the UE fails to support the concurrent transmission of the PUCCH and the PUSCH), there may exist the following two circumstances during the transmission and the reception of the PUSCH.

To be specific, in a first circumstance, behaviors of the UE will be described as follows.

Upon the receipt of at least one of the two PDSCHs, the UE may determine that there is the HARQ-ACK information on the grant-free PUSCH at the uplink time point, and set the one-bit indication information about the HARQ-ACK as 0 (it is presumed that, 0 represents that there is the HARQ-ACK information on the PUSCH).

The UE may acquire the quantity of target encoded bits through performing the channel encoding and the rate matching operations on the indication information. For example, a placeholder encoding mode may be adopted, as shown in Table 1. An initial placeholder encoding operation may be performed with respect to different modulation schemes Qm, and encoding information acquired after the initial placeholder encoding operation may be subjected to repetition encoding to acquire the quantity of the target encoded bits. Alternatively, the RM encoding or polar encoding mode and the rate matching mode may be directly used so as to acquire the quantity of the target encoded bits. The quantity of the target encoded bits may be determined in accordance with the resource size of the resource occupied by the indication information on the target PUSCH and the adopted modulation scheme. For example, when it is determined, through high-layer signaling or in accordance with a resource parameter configured by a high layer and the transmission parameter of the PUSCH, that ten REs have been occupied by the indication information and the BSPK mode (Qm=1) is adopted, the quantity of the target encoded bits may be 10. For another example, when ten REs have been occupied by the indication information and the QPSK mode (Qm=2) is adopted, the quantity of the target encoded bits may be 20. Information acquired through encoding the indication information may be modulated to acquire a modulation symbol of the indication information, and then the modulation symbol may be mapped to a corresponding resource on the target PUSCH (especially the first transmission resource occupied by the indication information on the target PUSCH) for transmission.

TABLE 1 placeholder encoding of the HARQ-ACK information

| Modulation schemes $Q_m$ | HARQ-ACK encoding |
|---|---|
| 2 | $[o_0^{ACK} y]$ |
| 4 | $[o_0^{ACK} y\ x\ x]$ |
| 6 | $[o_0^{ACK} y\ x\ x\ x\ x]$ |

The UE may generate the one-bit HARQ-ACK information for each CBG of each PDSCH, so as to acquire the HARQ-ACK information having totally eight bits. When merely one PDSCH has been received by the UE, the UE may determine, in accordance with a type of a codebook of the HARQ-ACK (a semistatic or dynamic codebook), that the total quantity of feedback bits is 8, encode (perform the rate matching operation) and modulate the 8-bit HARQ-ACK information in accordance with the resource size of the transmission of the HARQ-ACK information on the target PUSCH and the modulation scheme of the HARQ-ACK information, and map the acquired HARQ-ACK information to a corresponding resource on the target PUSCH (especially a second transmission resource occupied by the HARQ-ACK information on the target PUSCH) for transmission.

The UE may take resources occupied by the target PUSCH, except the first transmission resource occupied by the indication information and the second transmission resource occupied by the HARQ-ACK information, as resources for the data transmission, perform the encoding, rate matching and modulation operations on the to-be-transmitted data, and map the data to the corresponding resources for the data transmission.

Correspondingly, behaviors of the base station in the first circumstance will be described as follows.

The base station may determine the first transmission resource occupied by the indication information on the target PUSCH in a same way as that in the UE, receive the indication information on the corresponding first transmission resource, decode the indication information to acquire the original one-bit indication information, and determine that there is the HARQ-ACK information on the target PUSCH in accordance with the fact that the one-bit indication information is 0.

Further, the base station may determine the second transmission resource occupied by the HARQ-ACK information on the target PUSCH in a same way as that in the UE, receive the HARQ-ACK information on the corresponding second transmission resource, decode the HARQ-ACK information to acquire the initial 8-bit HARQ-ACK information, and determine how to retransmit the CBGs of the PDSCH in accordance with the HARQ-ACK information.

Further, the base station may determine the resources occupied by the target PUSCH, except the first transmission resource occupied by the indication information and the second transmission resource occupied by the HARQ-ACK information, as the resources for the data transmission in a same way as that in the UE, receive the data on the corresponding resources, and decode the data to acquire data information transmitted on the PUSCH, e.g., the TB s.

As mentioned hereinabove, in a second circumstance, behaviors of the UE will be described as follows.

When the UE fails to receive the two PDSCHs (i.e., the two PDSCHs have been lost), the UE may determine that there is no HARQ-ACK information on the grant-free PUSCH at the uplink time point, and set the one-bit indication information about the HARQ-ACK as 1 (it is presumed that, 1 represents that there is no HARQ-ACK information on the PUSCH).

The UE may acquire the quantity of target encoded bits through performing the channel encoding and rate matching operations on the indication information. For example, a placeholder encoding mode may be adopted. An initial placeholder encoding operation may be performed with respect to different modulation schemes Qm, and encoding information acquired after the initial placeholder encoding operation may be subjected to repetition encoding to acquire the quantity of the target encoded bits. Alternatively, the RM encoding or polar encoding mode and the rate matching mode may be directly used so as to acquire the quantity of the target encoded bits. The quantity of the target encoded bits may be determined in accordance with the resource size of the resource occupied by the indication information on the target PUSCH and the adopted modulation scheme. For example, when it is determined, through high-layer signaling or in accordance with a resource parameter configured by a high layer and the transmission parameter of the PUSCH, that ten REs have been occupied by the indication information and the BSPK mode (Qm=1) is adopted, the quantity of the target encoded bits may be 10. For another example, when ten REs have been occupied by the indication information and the QPSK mode (Qm=2) is adopted, the quantity of the target encoded bits may be 20. Information acquired through encoding the indication information may be modulated to acquire a modulation symbol of the indication information, and then the modulation symbol may be mapped to a corresponding resource on the target PUSCH (especially the first transmission resource occupied by the indication information on the target PUSCH) for transmission. The behaviors of the UE when performing the channel encoding, rate matching, modulation and mapping operations on the indication information in this circumstance may be the same as those of the UE in the first circumstance.

The UE may take the resources occupied by the target PUSCH, except the first transmission resource occupied by the indication information on the PUSCH, as the resources for the data transmission, perform the encoding, rate matching and modulation operations on the to-be-transmitted data, and map the data to the corresponding resources for the data transmission.

Correspondingly, in the second circumstance, the behaviors of the base station will be described as follows.

The base station may determine the first transmission resource occupied by the indication information on the target PUSCH in a same way as that in the UE, receive the indication information on the corresponding first transmission resource, decode the indication information to acquire the original one-bit indication information, and determine that there is no HARQ-ACK information on the target PUSCH in accordance with the fact that the one-bit indication information is 1. Further, when the base station has actually scheduled the PDSCH for the UE, the base station may further determine that the scheduled PDSCH has been lost at the UE, and retransmit the corresponding PDSCH.

Further, the base station may determine the resources occupied by the target PUSCH, except the first transmission resource occupied by the indication information, as the resources for the data transmission in a same way as that in the UE, receive the data on the corresponding resources, and decode the data to acquire the data information transmitted on the PUSCH, e.g., the TBs.

In the second circumstance, although the PDSCH has been lost at the UE, due to the indication information on the PUSCH, the base station may determine whether there is the HARQ-ACK on the PUSCH in accordance with the indication information, so as to determine the resources occupied by the data transmitted on the PUSCH, thereby to correctly decode the data.

It should be appreciated that, the grant-free PUSCH is taken as an example in the above embodiments. However, the PUSCH transmission and reception methods may also be applicable when the PUSCH is the PUSCH without any uplink grant, the PUSCH without any DAI, the SPS PUSCH, or the PUSCH with the uplink grant including no DAI. Of course, the methods may also be applicant with respect to any other PUSCH, e.g., a PUSCH with the uplink grant including the DAI, which will not be particularly defined herein. In addition, the PDSCH for which the HARQ-ACK needs to be fed back is taken as an example in the above embodiments, and the methods may also be applicable with respect to the PDCCH indicating the release of the downlink SPS resources.

It should be further appreciated that, merely the CBG-based HARQ-ACK feedback is taken as an example in the above embodiments, and the methods may also be applicable in the case that the HARQ-ACK is not fed back on the basis of the CBGs the HARQ-ACKs for a plurality of PDSCHs and/or the PDCCH indicating the release of the downlink SPS resources are to be fed back at the same uplink time point. In addition, merely a single carrier is taken as an example in the above embodiments, and of course, the methods may also be applicable in the case that a plurality of carriers is aggregated and the HARQ-ACK is to be fed back for the downlink transmission on the plurality of carriers at the same uplink transmission time point.

Figure 4:
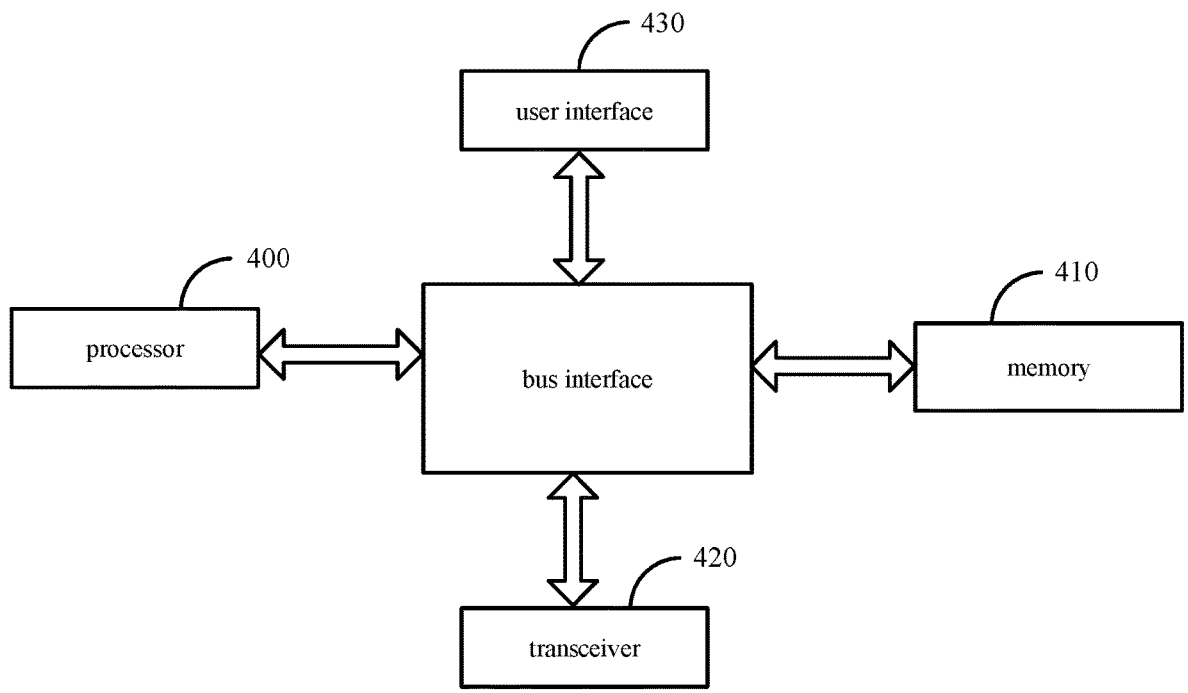
FIG. 4 is a schematic view showing a UE according to some embodiments of the present disclosure.

As shown in FIG. 4, the present disclosure further provides in some embodiments a UE, which includes a transceiver 420, a memory 410, a processor 400, a user interface 430 and a computer program stored in the memory 410 and executed by the processor 400. The processor 400 is configured to read the computer program in the memory, so as to determine indication information about an HARQ-ACK, and the indication information about the HARQ-ACK may be at least used to indicate whether there is HARQ-ACK information on a target PUSCH. The transceiver 420 is configured to transmit the indication information on the target PUSCH.

In some possible embodiments of the present disclosure, the transceiver 420 is further configured to transmit the indication information on the target PUSCH using rate matching.

In some possible embodiments of the present disclosure, the processor 400 is further configured to determine that data transmitted on the target PUSCH is not mapped to one or more resources occupied by the indication information on the target PUSCH.

In some possible embodiments of the present disclosure, the processor 400 is further configured to: determine a first transmission resource occupied by the indication information on the target PUSCH; and perform channel encoding, rate matching and modulation operations sequentially on the indication information, and map the indication information to the first transmission resource of the target PUSCH for transmission.

In some possible embodiments of the present disclosure, the processor 400 is further configured to: acquire a predetermined or preconfigured resource position and a predetermined or preconfigured resource size of the first transmission resource on the target PUSCH, or acquire the predetermined or preconfigured resource position of the first transmission resource on the target PUSCH and determine the resource size of the first transmission resource on the target PUSCH in accordance with a preconfigured configuration parameter and a transmission parameter of the target PUSCH; and determine the first transmission resource in accordance with the resource position and the resource size of the first transmission resource.

In some possible embodiments of the present disclosure, the processor 400 is further configured to perform a channel encoding operation independently on the indication information and the data transmitted on the target PUSCH.

In some possible embodiments of the present disclosure, the processor 400 is further configured to, when the indication information indicates that there is the HARQ-ACK information on the target PUSCH, perform a channel encoding operation independently on the indication information and the HARQ-ACK information.

In some possible embodiments of the present disclosure, the processor 400 is further configured to determine a modulation scheme of the indication information. The modulation scheme of the indication information may be identical to a modulation scheme of the target PUSCH, or the modulation scheme of the indication information may be determined as a predefined or preconfigured BPSK modulation scheme, QPSK modulation scheme or 16QAM modulation scheme.

In some possible embodiments of the present disclosure, the quantity of bits of the indication information may be one. When an indication state of the one-bit indication information is 0, the indication information may be used to indicate that there is the HARQ-ACK information on the target PUSCH, and when the indication state of the one-bit indication information is 1, the indication information may be used to indicate that there is no HARQ-ACK information on the target PUSCH; or when the indication state of the one-bit indication information is 1, the indication information may be used to indicate that there is the HARQ-ACK information on the target PUSCH, and when the indication state of the one-bit indication information is 0, the indication information may be used to indicate that there is no HARQ-ACK information on the target PUSCH.

In some possible embodiments of the present disclosure, the indication information may include a first indication field and a second indication field. The first indication field may be used to indicate whether there is the HARQ-ACK information on the target PUSCH, the second indication field may be used to indicate the quantity of bits of the HARQ-ACK information, and the first indication field and the second indication field may be encoded independently or jointly.

In some possible embodiments of the present disclosure, the quantity of bits of the indication information may be M, one indication state of the M-bit indication information may be used to indicate that there is no HARQ-ACK information on the target PUSCH, the other indication states of the M-bit indication information may be used to indicate the quantity of bits of the HARQ-ACK information, where M is an integer greater than 1.

In some possible embodiments of the present disclosure, the target PUSCH may be one of a PUSCH without a corresponding uplink grant and a PUSCH without a corresponding DAI; or the target PUSCH may be any one of an SPS PUSCH, a grant-free PUSCH, and a PUSCH with a corresponding uplink grant including no DAI.

In some possible embodiments of the present disclosure, the processor 400 is further configured to determine whether at least one of predetermined conditions is met, and when at least one of the predetermined conditions has been met, determine the indication information. The predetermined conditions may include a condition where the quantity of the bits of the HARQ-ACK information transmitted on the target PUSCH is greater than a predetermined value, a condition where the HARQ-ACK information is transmitted on the target PUSCH using rate matching, and a condition where a UE for transmitting the target PUSCH does not support the concurrent transmission of a PUCCH and the PUSCH.

According to the embodiments of the present disclosure, the UE may additionally transmit the indication information about the HARQ-ACK on the target PUSCH, and the indication information about the HARQ-ACK may be at least used to indicate whether there is the HARQ-ACK information on the target PUSCH. As a result, it is able for the base station to determine whether there is the HARQ-ACK information on the target PUSCH in accordance with the indication information transmitted on the target PUSCH, enable the UE and the base station to understand the resources occupied by the data transmitted on the target PUSCH consistently, and enable the base station to correctly receive the data transmitted on the target PUSCH, thereby to improve the transmission performance.

Figure 5:
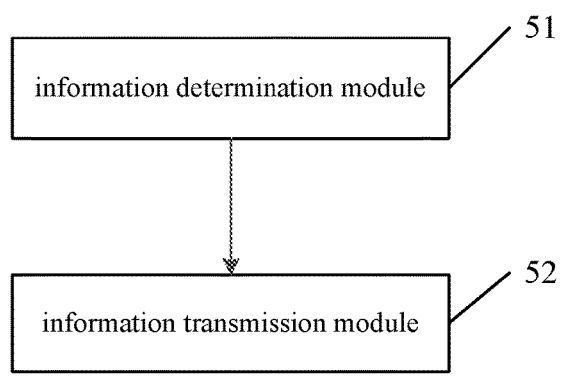
FIG. 5 is a schematic view showing a PUSCH transmission device according to some embodiments of the present disclosure.

As shown in FIG. 5, the present disclosure further provides in some embodiments a PUSCH transmission device, which includes: an information determination module 51 configured to determine indication information about an HARQ-ACK, the indication information about the HARQ-ACK being at least used to indicate whether there is HARQ-ACK information on a target PUSCH; and an information transmission module 52 configured to transmit the indication information on the target PUSCH.

In some possible embodiments of the present disclosure, the information transmission module 52 may include a first information transmission sub-module configured to transmit the indication information on the target PUSCH using rate matching.

In some possible embodiments of the present disclosure, the first information transmission sub-module may include an information transmission unit configured to determine that data transmitted on the target PUSCH is not mapped to one or more resources occupied by the indication information on the target PUSCH.

In some possible embodiments of the present disclosure, the information transmission module 52 may include: a resource determination sub-module configured to determine a first transmission resource occupied by the indication information on the target PUSCH; and a second information transmission sub-module configured to perform channel encoding, rate matching and modulation operations sequentially on the indication information, and map the indication information to the first transmission resource of the target PUSCH for transmission.

In some possible embodiments of the present disclosure, the resource determination sub-module may include: a first resource determination unit configured to acquire a predetermined or preconfigured resource position and a predetermined or preconfigured resource size of the first transmission resource on the target PUSCH, or acquire the predetermined or preconfigured resource position of the first transmission resource on the target PUSCH and determine the resource size of the first transmission resource on the target PUSCH in accordance with a preconfigured configuration parameter and a transmission parameter of the target PUSCH; and a second resource determination unit configured to determine the first transmission resource in accordance with the resource position and the resource size of the first transmission resource.

In some possible embodiments of the present disclosure, the information transmission module 52 may further include a first encoding module configured to perform a channel encoding operation independently on the indication information and the data transmitted on the target PUSCH.

In some possible embodiments of the present disclosure, the information transmission module 52 may further include a second encoding module configured to, when the indication information indicates that there is the HARQ-ACK information on the target PUSCH, perform a channel encoding operation independently on the indication information and the HARQ-ACK information.

In some possible embodiments of the present disclosure, the information transmission module 52 may further include a modulation determination module configured to determine a modulation scheme of the indication information. The modulation scheme of the indication information may be identical to a modulation scheme of the target PUSCH, or the modulation scheme of the indication information may be determined as a predefined or preconfigured BPSK modulation scheme, QPSK modulation scheme or 16QAM modulation scheme.

In some possible embodiments of the present disclosure, the quantity of bits of the indication information may be one. When an indication state of the one-bit indication information is 0, the indication information may be used to indicate that there is the HARQ-ACK information on the target PUSCH, and when the indication state of the one-bit indication information is 1, the indication information may be used to indicate that there is no HARQ-ACK information on the target PUSCH; or when the indication state of the one-bit indication information is 1, the indication information may be used to indicate that there is the HARQ-ACK information on the target PUSCH, and when the indication state of the one-bit indication information is 0, the indication information may be used to indicate that there is no HARQ-ACK information on the target PUSCH.

In some possible embodiments of the present disclosure, the indication information may include a first indication field and a second indication field. The first indication field may be used to indicate whether there is the HARQ-ACK information on the target PUSCH, the second indication field may be used to indicate the quantity of bits of the HARQ-ACK information, and the first indication field and the second indication field may be encoded independently or jointly.

In some possible embodiments of the present disclosure, the quantity of bits of the indication information may be M, one indication state of the M-bit indication information may be used to indicate that there is no HARQ-ACK information on the target PUSCH, the other indication states of the M-bit indication information may be used to indicate the quantity of bits of the HARQ-ACK information, where M is an integer greater than 1.

In some possible embodiments of the present disclosure, the target PUSCH may be one of a PUSCH without a corresponding uplink grant and a PUSCH without a corresponding DAI; or the target PUSCH may be any one of an SPS PUSCH, a grant-free PUSCH, and a PUSCH with a corresponding uplink grant including no DAI.

In some possible embodiments of the present disclosure, the transmission device may further include a first determination module configured to determine whether at least one of predetermined conditions is met, and when at least one of the predetermined conditions has been met, determine the indication information. The predetermined conditions may include a condition where the quantity of the bits of the HARQ-ACK information transmitted on the target PUSCH is greater than a predetermined value, a condition where the HARQ-ACK information is transmitted on the target PUSCH using rate matching, and a condition where a UE for transmitting the target PUSCH does not support the concurrent transmission of a PUCCH and the PUSCH.

According to the embodiments of the present disclosure, the UE may additionally transmit the indication information about the HARQ-ACK on the target PUSCH, and the indication information about the HARQ-ACK may be at least used to indicate whether there is the HARQ-ACK information on the target PUSCH. As a result, it is able for the base station to determine whether there is the HARQ-ACK information on the target PUSCH in accordance with the indication information transmitted on the target PUSCH, enable the UE and the base station to understand the resources occupied by the data transmitted on the target PUSCH consistently, and enable the base station to correctly receive the data transmitted on the target PUSCH, thereby to improve the transmission performance.

It should be appreciated that, the PUSCH transmission device in the embodiments of the present disclosure is capable of implementing the above-mentioned PUSCH transmission method, and the implementation of the PUSCH transmission device may refer to that of the PUSCH transmission method with a same or similar beneficial effect.

The present disclosure further provides in some embodiments a computer-readable storage medium storing therein a computer program. The computer program is executed by a processor so as to implement the above-mentioned PUSCH transmission method with a same technical effect, which will not be particularly defined herein. The computer-readable storage medium may be a Read-Only Memory (ROM), a Random Access Memory (RAM), a magnetic disk or an optical disk.

Figure 6:
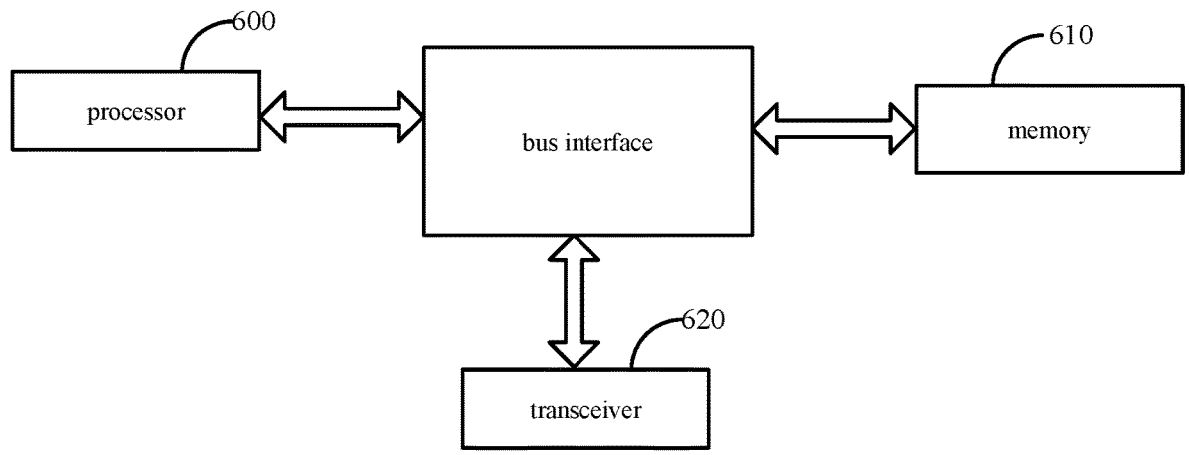
FIG. 6 is a schematic view showing a base station according to some embodiments of the present disclosure.

As shown in FIG. 6, the present disclosure further provides in some embodiments a base station which includes a transceiver 620, a memory 610, a processor 600, and a computer program stored in the memory 610 and executed by the processor 600. The transceiver 620 is configured to receive indication information about an HARQ-ACK on a target PUSCH, and the indication information about the HARQ-ACK may be at least used to indicate whether there is HARQ-ACK information on the target PUSCH. The processor 600 is configured to read the computer program stored in the memory so as to determine whether there is the HARQ-ACK information on the target PUSCH in accordance with the indication information.

In some possible embodiments of the present disclosure, the transceiver 620 is further configured to receive the indication information on the target PUSCH using rate matching.

In some possible embodiments of the present disclosure, the processor 600 is further configured to determine that data transmitted on the target PUSCH is not mapped to one or more resources occupied by the indication information on the target PUSCH.

In some possible embodiments of the present disclosure, the processor 600 is further configured to determine a first transmission resource occupied by the indication information on the target PUSCH, and the transceiver 620 is further configured to receive the indication information about the HARQ-ACK on the first transmission resource.

In some possible embodiments of the present disclosure, the processor 600 is further configured to: acquire a predetermined or preconfigured resource position and a predetermined or preconfigured resource size of the first transmission resource on the target PUSCH, or acquire the predetermined or preconfigured resource position of the first transmission resource on the target PUSCH and determining the resource size of the first transmission resource on the target PUSCH in accordance with a preconfigured configuration parameter and a transmission parameter of the target PUSCH; and determine the first transmission resource in accordance with the resource position and the resource size of the first transmission resource.

In some possible embodiments of the present disclosure, the processor 600 is further configured to determine that a channel encoding operation is performed independently on the indication information and the data transmitted on the target PUSCH.

In some possible embodiments of the present disclosure, the processor 600 is further configured to, when the indication information indicates that there is the HARQ-ACK information on the target PUSCH, determine that the channel encoding operation is performed independently on the indication information and the data transmitted on the target PUSCH.

In some possible embodiments of the present disclosure, the processor 600 is further configured to determine a modulation scheme of the indication information. The modulation scheme of the indication information may be identical to a modulation scheme of the target PUSCH, or the modulation scheme of the indication information may be determined as a predefined or preconfigured BPSK modulation scheme, QPSK modulation scheme or 16QAM modulation scheme.

In some possible embodiments of the present disclosure, the quantity of bits of the indication information may be one. When an indication state of the one-bit indication information is 0, the indication information may be used to indicate that there is the HARQ-ACK information on the target PUSCH, and when the indication state of the one-bit indication information is 1, the indication information may be used to indicate that there is no HARQ-ACK information on the target PUSCH; or when the indication state of the one-bit indication information is 1, the indication information may be used to indicate that there is the HARQ-ACK information on the target PUSCH, and when the indication state of the one-bit indication information is 0, the indication information may be used to indicate that there is no HARQ-ACK information on the target PUSCH.

In some possible embodiments of the present disclosure, the indication information may include a first indication field and a second indication field. The first indication field may be used to indicate whether there is the HARQ-ACK information on the target PUSCH, the second indication field may be used to indicate the quantity of bits of the HARQ-ACK information, and the first indication field and the second indication field may be encoded independently or jointly.

In some possible embodiments of the present disclosure, the quantity of bits of the indication information may be M, one indication state of the M-bit indication information may be used to indicate that there is no HARQ-ACK information on the target PUSCH, the other indication states of the M-bit indication information may be used to indicate the quantity of bits of the HARQ-ACK information, where M is an integer greater than 1.

In some possible embodiments of the present disclosure, the target PUSCH may be one of a PUSCH without a corresponding uplink grant and a PUSCH without a corresponding DAI.

In another possible embodiment of the present disclosure, the target PUSCH may be any one of an SPS PUSCH, a grant-free PUSCH, and a PUSCH with a corresponding uplink grant including no DAI.

In some possible embodiments of the present disclosure, the processor 600 is further configured to determine whether at least one of predetermined conditions is met, and when at least one of the predetermined conditions has been met, receive the indication information about the HARQ-ACK on the target PUSCH. The predetermined conditions may include a condition where the quantity of the bits of the HARQ-ACK information transmitted on the target PUSCH is greater than a predetermined value, a condition where the HARQ-ACK information is transmitted on the target PUSCH using rate matching, and a condition where a UE for transmitting the target PUSCH does not support the concurrent transmission of a PUCCH and the PUSCH.

According to the embodiments of the present disclosure, the UE may additionally transmit the indication information about the HARQ-ACK on the target PUSCH, and the indication information about the HARQ-ACK may be at least used to indicate whether there is the HARQ-ACK information on the target PUSCH. As a result, it is able for the base station to determine whether there is the HARQ-ACK information on the target PUSCH in accordance with the indication information transmitted on the target PUSCH, enable the UE and the base station to understand the resources occupied by the data transmitted on the target PUSCH consistently, and enable the base station to correctly receive the data transmitted on the target PUSCH, thereby to improve the transmission performance.

It should be appreciated that, the base station in the embodiments of the present disclosure is capable of implementing the above-mentioned PUSCH reception method, and the implementation of the base station may refer to that of the PUSCH reception method with a same or similar beneficial effect.

Figure 7:
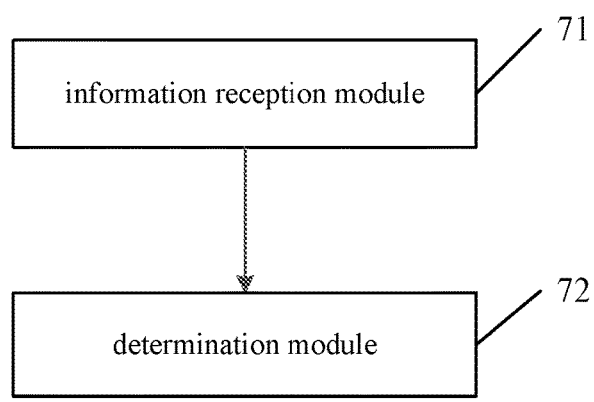
FIG. 7 is a schematic view showing a PUSCH reception device according to some embodiments of the present disclosure.

As shown in FIG. 7, the present disclosure further provides in some embodiments a PUSCH reception device which includes: an information reception module 71 configured to receive indication information about an HARQ-ACK on a target PUSCH, the indication information about the HARQ-ACK being at least used to indicate whether there is HARQ-ACK information on the target PUSCH; and a determination module 72 configured to determine whether there is the HARQ-ACK information on the target PUSCH in accordance with the indication information.

In some possible embodiments of the present disclosure, the information reception module 71 may include a first information reception sub-module configured to receive the indication information on the target PUSCH using rate matching.

In some possible embodiments of the present disclosure, the first information reception sub-module may include an occupation determination unit configured to determine that data transmitted on the target PUSCH is not mapped to one or more resources occupied by the indication information on the target PUSCH.

In some possible embodiments of the present disclosure, the information reception module 71 may include: a first transmission sub-module configured to determine a first transmission resource occupied by the indication information on the target PUSCH; and a second information reception sub-module configured to receive the indication information about the HARQ-ACK on the first transmission resource.

In some possible embodiments of the present disclosure, the first transmission sub-module may include: a transmission acquisition unit configured to acquire a predetermined or preconfigured resource position and a predetermined or preconfigured resource size of the first transmission resource on the target PUSCH, or acquire the predetermined or preconfigured resource position of the first transmission resource on the target PUSCH and determining the resource size of the first transmission resource on the target PUSCH in accordance with a preconfigured configuration parameter and a transmission parameter of the target PUSCH; and a transmission determination unit configured to determine the first transmission resource in accordance with the resource position and the resource size of the first transmission resource.

In some possible embodiments of the present disclosure, the determination module 72 may include a first encoding determination module configured to determine that a channel encoding operation is performed independently on the indication information and the data transmitted on the target PUSCH.

In some possible embodiments of the present disclosure, the determination module 72 may include a second encoding determination module configured to, when the indication information indicates that there is the HARQ-ACK information on the target PUSCH, determine that the channel encoding operation is performed independently on the indication information and the data transmitted on the target PUSCH.

In some possible embodiments of the present disclosure, the determination module 72 may include a modulation determination module configured to determine a modulation scheme of the indication information. The modulation scheme of the indication information may be identical to a modulation scheme of the target PUSCH, or the modulation scheme of the indication information may be determined as a predefined or preconfigured BPSK modulation scheme, QPSK modulation scheme or 16QAM modulation scheme.

In some possible embodiments of the present disclosure, the quantity of bits of the indication information may be one. When an indication state of the one-bit indication information is 0, the indication information may be used to indicate that there is the HARQ-ACK information on the target PUSCH, and when the indication state of the one-bit indication information is 1, the indication information may be used to indicate that there is no HARQ-ACK information on the target PUSCH; or when the indication state of the one-bit indication information is 1, the indication information may be used to indicate that there is the HARQ-ACK information on the target PUSCH, and when the indication state of the one-bit indication information is 0, the indication information may be used to indicate that there is no HARQ-ACK information on the target PUSCH.

In some possible embodiments of the present disclosure, the indication information may include a first indication field and a second indication field. The first indication field may be used to indicate whether there is the HARQ-ACK information on the target PUSCH, the second indication field may be used to indicate the quantity of bits of the HARQ-ACK information, and the first indication field and the second indication field may be encoded independently or jointly.

In some possible embodiments of the present disclosure, the quantity of bits of the indication information may be M, one indication state of the M-bit indication information may be used to indicate that there is no HARQ-ACK information on the target PUSCH, the other indication states of the M-bit indication information may be used to indicate the quantity of bits of the HARQ-ACK information, where M is an integer greater than 1.

In some possible embodiments of the present disclosure, the target PUSCH may be one of a PUSCH without a corresponding uplink grant and a PUSCH without a corresponding DAI; or the target PUSCH may be any one of an SPS PUSCH, a grant-free PUSCH, and a PUSCH with a corresponding uplink grant including no DAI.

In some possible embodiments of the present disclosure, the reception device may further include a second determination module configured to determine whether at least one of predetermined conditions is met, and when at least one of the predetermined conditions has been met, receive the indication information about the HARQ-ACK on the target PUSCH. The predetermined conditions may include a condition where the quantity of the bits of the HARQ-ACK information transmitted on the target PUSCH is greater than a predetermined value, a condition where the HARQ-ACK information is transmitted on the target PUSCH using rate matching, and a condition where a UE for transmitting the target PUSCH does not support the concurrent transmission of a PUCCH and the PUSCH.

According to the embodiments of the present disclosure, the UE may additionally transmit the indication information about the HARQ-ACK on the target PUSCH, and the indication information about the HARQ-ACK may be at least used to indicate whether there is the HARQ-ACK information on the target PUSCH. As a result, it is able for the base station to determine whether there is the HARQ-ACK information on the target PUSCH in accordance with the indication information transmitted on the target PUSCH, enable the UE and the base station to understand the resources occupied by the data transmitted on the target PUSCH consistently, and enable the base station to correctly receive the data transmitted on the target PUSCH, thereby to improve the transmission performance.

It should be appreciated that, the PUSCH reception device in the embodiments of the present disclosure is capable of implementing the above-mentioned PUSCH reception method, and the implementation of the PUSCH reception device may refer to that of the PUSCH reception method with a same or similar beneficial effect.

The present disclosure further provides in some embodiments a computer-readable storage medium storing therein a computer program. The computer program is executed by a processor so as to implement the above-mentioned PUSCH reception method with a same technical effect, which will not be particularly defined herein. The computer-readable storage medium may be an ROM, an RAM, a magnetic disk or an optical disk.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A Physical Uplink Shared Channel (PUSCH) transmission method performed by a User Equipment (UE), the PUSCH transmission method comprising:
   generating indication information about a Hybrid Automatic Repeat reQuest Acknowledgement (HARQ-ACK), the indication information about the HARQ-ACK being used to indicate whether there is HARQ-ACK information on a target PUSCH; and
   transmitting the indication information on the target PUSCH,
   wherein the transmitting the indication information on the target PUSCH comprises: determining a first transmission resource occupied by the indication information on the target PUSCH; and performing channel encoding, rate matching and modulation operations sequentially on the indication information, and mapping the indication information to the first transmission resource of the target PUSCH for transmission,
   wherein the determining the first transmission resource occupied by the indication information on the target PUSCH comprises:
   acquiring a predetermined or preconfigured resource position and a predetermined or preconfigured resource size of the first transmission resource on the target PUSCH, or acquiring the predetermined or preconfigured resource position of the first transmission resource on the target PUSCH and determining the resource size of the first transmission resource on the target PUSCH in accordance with a preconfigured configuration parameter and a transmission parameter of the target PUSCH; and
   determining the first transmission resource in accordance with the resource position and the resource size of the first transmission resource.

2. The PUSCH transmission method according to claim 1, wherein the transmitting the indication information on the target PUSCH further comprises at least one of:
   transmitting the indication information on the target PUSCH using rate matching or determining that data transmitted on the target PUSCH is not mapped to one or more resources occupied by the indication information on the target PUSCH;
   performing a channel encoding operation independently on the indication information and the data transmitted on the target PUSCH;
   when the indication information indicates that there is the HARQ-ACK information on the target PUSCH, performing a channel encoding operation independently on the indication information and the HARQ-ACK information;
   determining a modulation scheme of the indication information, wherein the modulation scheme of the indication information is identical to a modulation scheme of the target PUSCH, or the modulation scheme of the indication information is determined as a predefined or preconfigured Binary Phase-Shift Keying (BPSK) modulation scheme, Quadrature Phase Shift Keying (QPSK) modulation scheme or 16-Quadrature Amplitude Modulation (QAM) modulation scheme.

3. The PUSCH transmission method according to claim 1, wherein a quantity of bits of the indication information is at least one of:
   wherein the quantity of bits of the indication information is one, wherein when an indication state of the one-bit indication information is 0, the indication information is used to indicate that there is the HARQ-ACK information on the target PUSCH, and when the indication state of the one-bit indication information is 1, the indication information is used to indicate that there is no HARQ-ACK information on the target PUSCH; or when the indication state of the one-bit indication information is 1, the indication information is used to indicate that there is the HARQ-ACK information on the target PUSCH, and when the indication state of the one-bit indication information is 0, the indication information is used to indicate that there is no HARQ-ACK information on the target PUSCH;
   wherein the quantity of bits of the indication information is M, one indication state of the M-bit indication information is used to indicate that there is no HARQ-ACK information on the target PUSCH, the other indication states of the M-bit indication information are used to indicate the quantity of bits of the HARQ-ACK information, where M is an integer greater than 1; and/or
   wherein the indication information comprises a first indication field and a second indication field, the first indication field is used to indicate whether there is the HARQ-ACK information on the target PUSCH, the second indication field is used to indicate the quantity of bits of the HARQ-ACK information, and the first indication field and the second indication field are encoded independently or jointly.

4. The PUSCH transmission method according to claim 1, wherein prior to determining the indication information, the PUSCH transmission method further comprises:
   determining whether at least one of predetermined conditions is met, and when at least one of the predetermined conditions has been met, determining the indication information,
   wherein the predetermined conditions comprise:
   the target PUSCH is one of a PUSCH without a corresponding uplink grant and a PUSCH without a corresponding Downlink Assignment Index (DAI); or the target PUSCH is any one of a Semi-Persistent Scheduling (SPS) PUSCH, a grant-free PUSCH, and a PUSCH with a corresponding uplink grant comprising no DAI;
   a condition where the quantity of the bits of the HARQ-ACK information transmitted on the target PUSCH is greater than a predetermined value, a condition where the HARQ-ACK information is transmitted on the target PUSCH using rate matching, and a condition where the UE for transmitting the target PUSCH does not support the simultaneous transmission of a Physical Uplink Control Channel (PUCCH) and the PUSCH.

5. A Physical Uplink Shared Channel (PUSCH) reception method performed by a base station, the PUSCH reception method comprising:
receiving indication information about a Hybrid Automatic Repeat reQuest Acknowledgement (HARQ-ACK) on a target PUSCH, the indication information about the HARQ-ACK being used to indicate whether there is HARQ-ACK information on the target PUSCH; and
determining whether there is the HARQ-ACK information on the target PUSCH in accordance with the indication information,
wherein the receiving the indication information about the HARQ-ACK on the target PUSCH comprises: determining a first transmission resource occupied by the indication information on the target PUSCH; and receiving the indication information about the HARQ-ACK on the first transmission resource,
wherein the determining the first transmission resource occupied by the indication information on the target PUSCH comprises:
acquiring a predetermined or preconfigured resource position and a predetermined or preconfigured resource size of the first transmission resource on the target PUSCH, or acquiring the predetermined or preconfigured resource position of the first transmission resource on the target PUSCH and determining the resource size of the first transmission resource on the target PUSCH in accordance with a preconfigured configuration parameter and a transmission parameter of the target PUSCH; and
determining the first transmission resource in accordance with the resource position and the resource size of the first transmission resource.

6. The PUSCH reception method according to claim 5, wherein the receiving the indication information about the HARQ-ACK on the target PUSCH further comprises at least one of:
receiving the indication information on the target PUSCH using rate matching or determining that data transmitted on the target PUSCH is not mapped to one or more resources occupied by the indication information on the target PUSCH;
determining that a channel encoding operation is performed independently on the indication information and the data transmitted on the target PUSCH;
when the indication information indicates that there is the HARQ-ACK information on the target PUSCH, determining that the channel encoding operation is performed independently on the indication information and the data transmitted on the target PUSCH;
determining a modulation scheme of the indication information, wherein the modulation scheme of the indication information is identical to a modulation scheme of the target PUSCH, or the modulation scheme of the indication information is determined as a predefined or preconfigured Binary Phase-Shift Keying (BPSK) modulation scheme, Quadrature Phase Shift Keying (QPSK) modulation scheme or 16-Quadrature Amplitude Modulation (QAM) modulation scheme.

7. The PUSCH reception method according to claim 5, wherein a quantity of bits of the indication information is at least one of:
wherein the quantity of bits of the indication information is one, wherein when an indication state of the one-bit indication information is 0, the indication information is used to indicate that there is the HARQ-ACK information on the target PUSCH, and when the indication state of the one-bit indication information is 1, the indication information is used to indicate that there is no HARQ-ACK information on the target PUSCH; or when the indication state of the one-bit indication information is 1, the indication information is used to indicate that there is the HARQ-ACK information on the target PUSCH, and when the indication state of the one-bit indication information is 0, the indication information is used to indicate that there is no HARQ-ACK information on the target PUSCH;
wherein the quantity of bits of the indication information is M, one indication state of the M-bit indication information is used to indicate that there is no HARQ-ACK information on the target PUSCH, the other indication states of the M-bit indication information are used to indicate the quantity of bits of the HARQ-ACK information, where M is an integer greater than 1; and/or
wherein the indication information comprises a first indication field and a second indication field, the first indication field is used to indicate whether there is the HARQ-ACK information on the target PUSCH, the second indication field is used to indicate the quantity of bits of the HARQ-ACK information, and the first indication field and the second indication field are encoded independently or jointly.

8. The PUSCH reception method according to claim 5, wherein prior to receiving the indication information about the HARQ-ACK on the target PUSCH, the PUSCH reception method further comprises:
determining whether at least one of predetermined conditions is met, and when at least one of the predetermined conditions has been met, receiving the indication information about the HARQ-ACK on the target PUSCH,
wherein the predetermined conditions comprise:
the target PUSCH is one of a PUSCH without a corresponding uplink grant and a PUSCH without a corresponding DAI; or the target PUSCH is any one of a Semi-Persistent Scheduling (SPS) PUSCH, a grant-free PUSCH, and a PUSCH with a corresponding uplink grant comprising no DAI;
a condition where the quantity of the bits of the HARQ-ACK information transmitted on the target PUSCH is greater than a predetermined value, a condition where the HARQ-ACK information is transmitted on the target PUSCH using rate matching, and a condition where a User Equipment (UE) for transmitting the target PUSCH does not support the concurrent transmission of a Physical Uplink Control Channel (PUCCH) and the PUSCH.

9. A User Equipment (UE), comprising:
a transceiver, a memory, a processor, and a computer program stored in the memory and executed by the processor, wherein the processor is configured to read the computer program in the memory, so as to generate indication information about an HARQ-ACK, the indication information about the HARQ-ACK is used to indicate whether there is HARQ-ACK information on a target PUSCH, and the transceiver is configured to transmit the indication information on the target PUSCH,
wherein the processor is further configured to determine a first transmission resource occupied by the indication information on the target PUSCH; and perform channel encoding, rate matching and modulation operations sequentially on the indication information, and map the indication information to the first transmission resource of the target PUSCH for transmission, wherein the processor is further configured to: acquire a predetermined or preconfigured resource position and a predetermined or preconfigured resource size of the first transmission resource on the target PUSCH, or acquire the predetermined or preconfigured resource position of the first transmission resource on the target PUSCH and determine the resource size of the first transmission resource on the target PUSCH in accordance with a preconfigured configuration parameter and a transmission parameter of the target PUSCH; and determine the first transmission resource in accordance with the resource position and the resource size of the first transmission resource.

10. The UE according to claim 9, wherein the processor is further configured to do at least one of:
transmit the indication information on the target PUSCH using rate matching or determine that data transmitted on the target PUSCH is not mapped to one or more resources occupied by the indication information on the target PUSCH;
perform a channel encoding operation independently on the indication information and the data transmitted on the target PUSCH;
when the indication information indicates that there is the HARQ-ACK information on the target PUSCH, perform a channel encoding operation independently on the indication information and the HARQ-ACK information;
determine a modulation scheme of the indication information, wherein the modulation scheme of the indication information is identical to a modulation scheme of the target PUSCH, or the modulation scheme of the indication information is determined as a predefined or preconfigured BPSK modulation scheme, QPSK modulation scheme or 16QAM modulation scheme.

11. The UE according to claim 9, wherein a quantity of bits of the indication information is at least one of:
wherein the quantity of bits of the indication information is one, wherein when an indication state of the one-bit indication information is 0, the indication information is used to indicate that there is the HARQ-ACK information on the target PUSCH, and when the indication state of the one-bit indication information is 1, the indication information is used to indicate that there is no HARQ-ACK information on the target PUSCH; or when the indication state of the one-bit indication information is 1, the indication information is used to indicate that there is the HARQ-ACK information on the target PUSCH, and when the indication state of the one-bit indication information is 0, the indication information is used to indicate that there is no HARQ-ACK information on the target PUSCH;
the quantity of bits of the indication information is M, one indication state of the M-bit indication information is used to indicate that there is no HARQ-ACK information on the target PUSCH, the other indication states of the M-bit indication information are used to indicate the quantity of bits of the HARQ-ACK information, where M is an integer greater than 1; and/or
wherein the indication information comprises a first indication field and a second indication field, the first indication field is used to indicate whether there is the HARQ-ACK information on the target PUSCH, the second indication field is used to indicate the quantity of bits of the HARQ-ACK information, and the first indication field and the second indication field are encoded independently or jointly.

12. The UE according to claim 9, wherein the processor is further configured to determine whether at least one of predetermined conditions is met, and when at least one of the predetermined conditions has been met, determine the indication information, wherein the predetermined conditions comprise:
the target PUSCH is one of a PUSCH without a corresponding uplink grant and a PUSCH without a corresponding DAI; or the target PUSCH is any one of an SPS PUSCH, a grant-free PUSCH, and a PUSCH with a corresponding uplink grant comprising no DAI;
a condition where the quantity of the bits of the HARQ-ACK information transmitted on the target PUSCH is greater than a predetermined value, a condition where the HARQ-ACK information is transmitted on the target PUSCH using rate matching, and a condition where a UE for transmitting the target PUSCH does not support the concurrent transmission of a PUCCH and the PUSCH.

13. A base station, comprising:
a transceiver, a memory, a processor, and a computer program stored in the memory and executed by the processor, wherein the transceiver is configured to achieve the Physical Uplink Shared Channel (PUSCH) reception method according to claim 5.

14. The base station according to claim 13, wherein the processor is further configured to do at least one of:
receive the indication information on the target PUSCH using rate matching or determine that data transmitted on the target PUSCH is not mapped to one or more resources occupied by the indication information on the target PUSCH;
determine that a channel encoding operation is performed independently on the indication information and the data transmitted on the target PUSCH;
when the indication information indicates that there is the HARQ-ACK information on the target PUSCH, determine that the channel encoding operation is performed independently on the indication information and the data transmitted on the target PUSCH;
determine a modulation scheme of the indication information, wherein the modulation scheme of the indication information is identical to a modulation scheme of the target PUSCH, or the modulation scheme of the indication information is determined as a predefined or preconfigured BPSK modulation scheme, QPSK modulation scheme or 16QAM modulation scheme.

15. The base station according to claim 13, wherein a quantity of bits of the indication information is at least one of:
wherein the quantity of bits of the indication information is one, wherein when an indication state of the one-bit indication information is 0, the indication information is used to indicate that there is the HARQ-ACK information on the target PUSCH, and when the indication state of the one-bit indication information is 1, the indication information is used to indicate that there is no HARQ-ACK information on the target PUSCH; or when the indication state of the one-bit indication information is 1, the indication information is used to indicate that there is the HARQ-ACK information on the target PUSCH, and when the indication state of the one-bit indication information is 0, the indication information is used to indicate that there is no HARQ-ACK information on the target PUSCH;

wherein the quantity of bits of the indication information is M, one indication state of the M-bit indication information is used to indicate that there is no HARQ-ACK information on the target PUSCH, the other indication states of the M-bit indication information are used to indicate the quantity of bits of the HARQ-ACK information, where M is an integer greater than 1; and/or wherein the indication information comprises a first indication field and a second indication field, the first indication field is used to indicate whether there is the HARQ-ACK information on the target PUSCH, the second indication field is used to indicate the quantity of bits of the HARQ-ACK information, and the first indication field and the second indication field are encoded independently or jointly.

16. The base station according to claim 13, wherein the processor is further configured to determine whether at least one of predetermined conditions is met, and when at least one of the predetermined conditions has been met, receive the indication information about the HARQ-ACK on the target PUSCH, wherein the predetermined conditions comprise:

the target PUSCH is one of a PUSCH without a corresponding uplink grant and a PUSCH without a corresponding DAI; or the target PUSCH is any one of an SPS PUSCH, a grant-free PUSCH, and a PUSCH with a corresponding uplink grant comprising no DAI;

a condition where the quantity of the bits of the HARQ-ACK information transmitted on the target PUSCH is greater than a predetermined value, a condition where the HARQ-ACK information is transmitted on the target PUSCH using rate matching, and a condition where a UE for transmitting the target PUSCH does not support the concurrent transmission of a PUCCH and the PUSCH.

* * * * *